(12) United States Patent
Sarabandi et al.

(10) Patent No.: US 12,584,993 B2
(45) Date of Patent: Mar. 24, 2026

(54) HIGH RESOLUTION 4-D MILLIMETER-WAVE IMAGING RADAR

(71) Applicant: THE REGENTS OF THE UNIVERSITY OF MICHIGAN, Ann Arbor, MI (US)

(72) Inventors: Kamal Sarabandi, Ann Arbor, MI (US); Aditya Varma Muppala, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 493 days.

(21) Appl. No.: 17/993,421

(22) Filed: Nov. 23, 2022

(65) Prior Publication Data

US 2023/0266436 A1 Aug. 24, 2023

Related U.S. Application Data

(60) Provisional application No. 63/282,997, filed on Nov. 24, 2021.

(51) Int. Cl.
| | |
|---|---|
| *G01S 7/03* | (2006.01) |
| *G01S 13/90* | (2006.01) |
| *H01Q 13/02* | (2006.01) |
| *H01Q 19/19* | (2006.01) |

(52) U.S. Cl.
CPC ............... *G01S 7/03* (2013.01); *G01S 13/90* (2013.01); *H01Q 13/02* (2013.01); *H01Q 19/19* (2013.01)

(58) Field of Classification Search
CPC ........... G01S 7/03; G01S 13/90; H01Q 13/02; H01Q 19/19; H01Q 19/193; H01Q 3/20
See application file for complete search history.

(56) References Cited

U.S. PATENT DOCUMENTS

| | | | | |
|---|---|---|---|---|
| 6,577,282 B1* | 6/2003 | Rao | ........................... | H01Q 3/18 |
| | | | | 343/781 CA |
| 7,609,196 B2* | 10/2009 | Jeck | .................... | G01S 13/9082 |
| | | | | 342/25 A |
| 11,264,729 B2* | 3/2022 | Hand | ..................... | H01Q 19/18 |
| 2007/0159405 A1* | 7/2007 | Eom | .................... | H01Q 19/193 |
| | | | | 343/781 CA |

(Continued)

*Primary Examiner* — Bernarr E Gregory
*Assistant Examiner* — Yonghong Li
(74) *Attorney, Agent, or Firm* — Harness, Dickey & Pierce, P.L.C.

(57) ABSTRACT

All existing state-of-the-art high resolution millimeter wave imaging systems experience a trade off between image acquisition time and transceiver array complexity. The proposed dual reflector antenna breaks this trade-off by drastically reducing the array formation time while maintaining the relative simplicity that comes with using a single transceiver element. It consists of a dual mode horn feed, a rotating ellipsoidal sub-reflector and a conic main reflector. The rotating sub-reflector creates a virtual phase center that rotates about an axis to produce a synthetic circular array with a diameter of 120λ. The main reflector redirects the beams from each of these virtual phase centers to overlap and illuminate the scene over a wide field of view. The proposed system can reduce the image acquisition time to the order of milliseconds/seconds which makes real-time SAR imaging a practical alternative to MIMO and phased arrays at millimeter-wave and sub-millimeter-wave frequencies.

8 Claims, 15 Drawing Sheets

(56)                    References Cited

U.S. PATENT DOCUMENTS

| | | | |
|---|---|---|---|
| 2009/0224993 A1* | 9/2009 | Peichl | G01S 13/426 |
| | | | 342/175 |
| 2013/0106649 A1* | 5/2013 | Brown | G01S 13/904 |
| | | | 342/25 A |
| 2022/0021111 A1* | 1/2022 | Naym | H01Q 19/19 |

* cited by examiner

Conic Main Reflector

Phase center
(Ellipsoid focus #2)

$80\lambda$

Phase center of horn
(Ellipsoid focus #1)

$\phi_{sub}$ $\theta_{sub}$

Rotation frequency
$f_{sub}$

Translation frequency $f_{main}$

Main
Reflector

Sub-Reflector

Linear
Actuator

Motor

Encoder

Controller

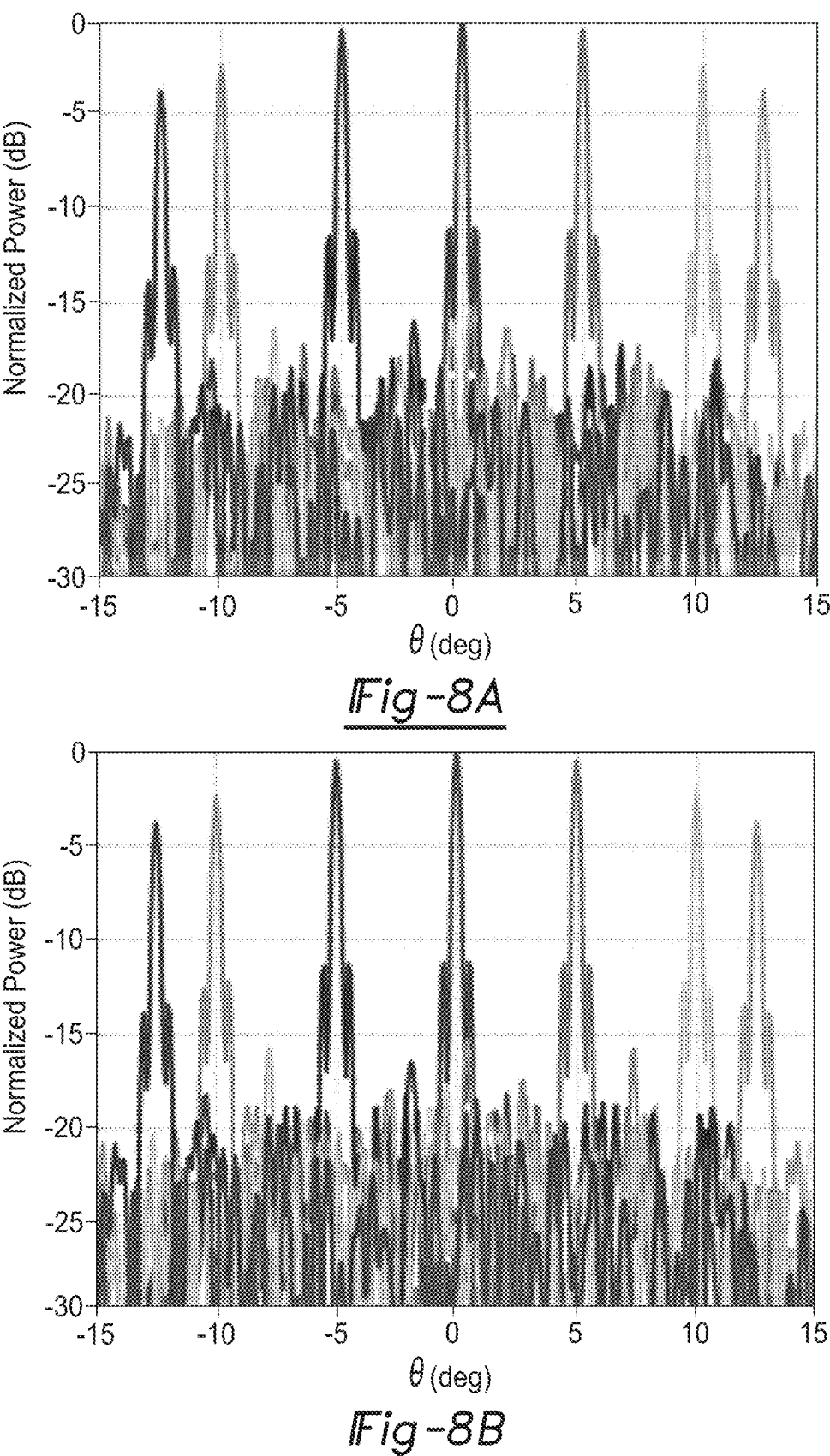
_Fig-8A_
_Fig-8B_

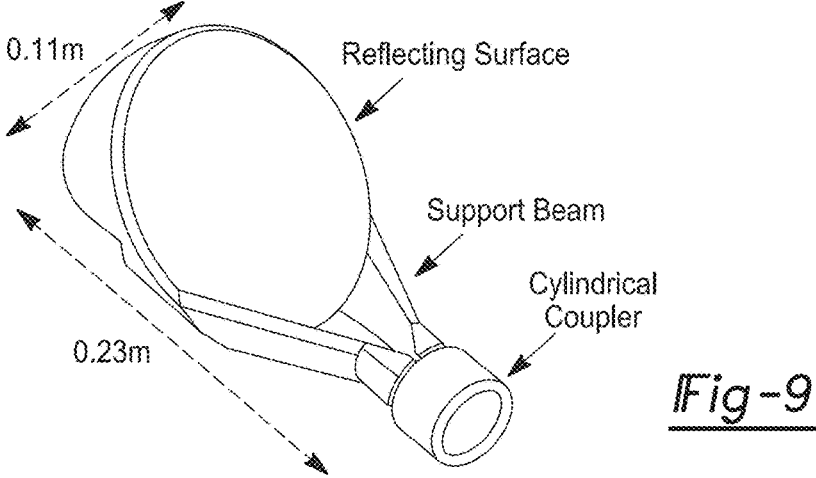
0.11m
Reflecting Surface
Support Beam
Cylindrical Coupler
0.23m
*Fig-9*
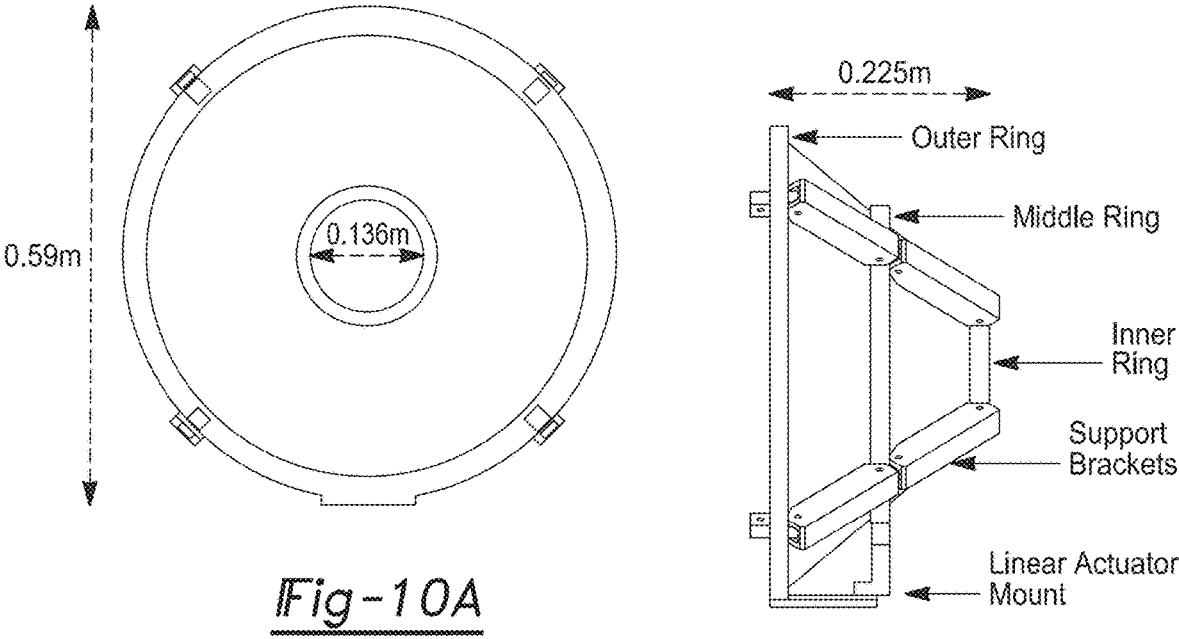
0.59m
0.136m
*Fig-10A*
0.225m
Outer Ring
Middle Ring
Inner Ring
Support Brackets
Linear Actuator Mount
*Fig-10B*

HIGH RESOLUTION 4-D MILLIMETER-WAVE IMAGING RADAR

CROSS-REFERENCE TO RELATED APPLICATIONS

This application claims the benefit of U.S. Provisional Application No. 63/282,997, filed on Nov. 24, 2021. The entire disclosure of the above application is incorporated herein by reference.

FIELD

The present disclosure relates to dual reflector antennas.

BACKGROUND

The rising tide of autonomous robotics has carried with it several niche technologies into the mainstream. Millimeter wave imaging radars, once used mainly for surveillance and remote sensing are now seeing significant adoption into autonomous vehicles. As with any technology that is widely adopted, the demand for better performance metrics at lower cost only increases with time. This introduces several interesting engineering challenges which in the case of imaging radar systems has attracted widespread interest over the past decade.

One of the fundamental challenges in imaging radars is offsetting the trade-off between image acquisition time and radar array complexity. On one end of the spectrum lies full array based systems such as phased arrays and reflectarrays. They scan the scene in "real-time" (microseconds) but require a very large number of transceivers and/or phase shifters to generate a narrow beam with low sidelobes. Designing such large arrays at millimeter-wave and sub-terahertz frequencies can become exponentially difficult if not impossible when beamwidths comparable to lidars are desired ($\approx 0.1°$ requires $\approx 106$ elements). Frequency scanning arrays are another alternative where large arrays can steer a narrow beam without the use of phase shifters or agile transceivers, but instead by sweeping the frequency. However, only 1-D scanning can be accomplished by this method.

On the other end lies synthetic aperture radars (SAR) that have a single transceiver which is moved in space to generate a virtual or "synthetic" array that can be used to digitally synthesize a narrow beam. Traditionally used in remote sensing from satellites and aircrafts, SAR systems have also been adopted for medical imaging, detection of concealed weapons and through-the-wall imaging. The common thread between all these applications is the static nature of the scene. Array formation requires moving the radar and this takes several minutes to hours which makes them unusable for imaging evolving targets. The imaging time can be reduced by an order of magnitude by making one dimension of the array a phased array and mechanically scanning the other dimension. This solution is merely a compromise and does not fundamentally improve on the trade-off.

Multiple Input Multiple Output (MIMO) radars do indeed improve on this trade-off by using fewer transmitters and receivers than phased arrays to achieve the same beamwidth while also reducing the physical size of the array. Due to this reason, MIMO radars have seen a broader adoption into autonomous vehicles and other applications where high-resolution high-speed imaging is desired. In principle, MIMO arrays can reduce the number of elements from N×N to 2N (i.e., N transmitters and N receivers) to achieve the same spatial resolution as an equally sized phased array. However, they quickly run into the problem of grating lobes and adjacent antenna coupling that can lead to diminishing returns when trying to reach very high resolutions. There exist MIMO signal processing techniques that can improve on the resolution obtained from digital beamforming but they come with their own set of challenges when implemented in autonomous applications. They rely on the target's Doppler and range discrimination to limit the number of targets for their angle of arrival estimation. As such they fail to accurately detect stationary targets in a traffic scene.

This section provides background information related to the present disclosure which is not necessarily prior art.

SUMMARY

This section provides a general summary of the disclosure, and is not a comprehensive disclosure of its full scope or all of its features.

In one aspect, a dual-reflector antenna is presented. The dual reflector antenna includes a main reflector, a sub-reflector and a feed horn. The main reflector has shape of a conic, where the conic is formed around a principal axis. The sub-reflector is arranged in the conic along the principal axis of the main reflector and is configured to rotate about the principal axis, such that the sub-reflector has a shape that defines two foci for electromagnetic radiation incident thereon. The feed horn is disposed along the principal axis at one of the two foci and operates to guide electromagnetic radiation towards the sub-reflector.

In one embodiment, the sub-reflector has shape of an ellipsoid, such that the ellipsoid of the sub-reflector defines a major axis and the major axis of the sub-reflector is tilted forty-five degrees with respect to the principal axis of the main reflector. A motor may be interoperably coupled to the sub-reflector and an encoder measures rotation of the sub-reflector.

In another aspect, the main reflector of the dual-reflector has shape of a paraboloid and the sub-reflector is arranged in the paraboloid along the principal axis of the main reflector. More specifically, the sub-reflector may have the shape of an ellipsoid, such that the major axis of the sub-reflector is tilted with respect to the principal axis of the main reflector while rotating about the principal axis. A linear actuator may be drivably coupled to the sub-reflector and operates to tilt the sub-reflector in relation to the principal axis.

In some embodiments, the dual-reflector antenna is part of a phase coherent wideband radar operating in millimeter-wave band.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 8A and 8B are graphs showing beamforming results from the PO model in E-plane and H-plane, respectively.

FIG. 9 illustrates an example embodiment of the sub-reflector with the reflecting surface formed by the ellipsoid geometry.

FIGS. 10A and 10B are a front view and a side view, respectively, of an example embodiment of the main reflector.

Corresponding reference numerals indicate corresponding parts throughout the several views of the drawings.

DETAILED DESCRIPTION

Figures 1, 2, 3:
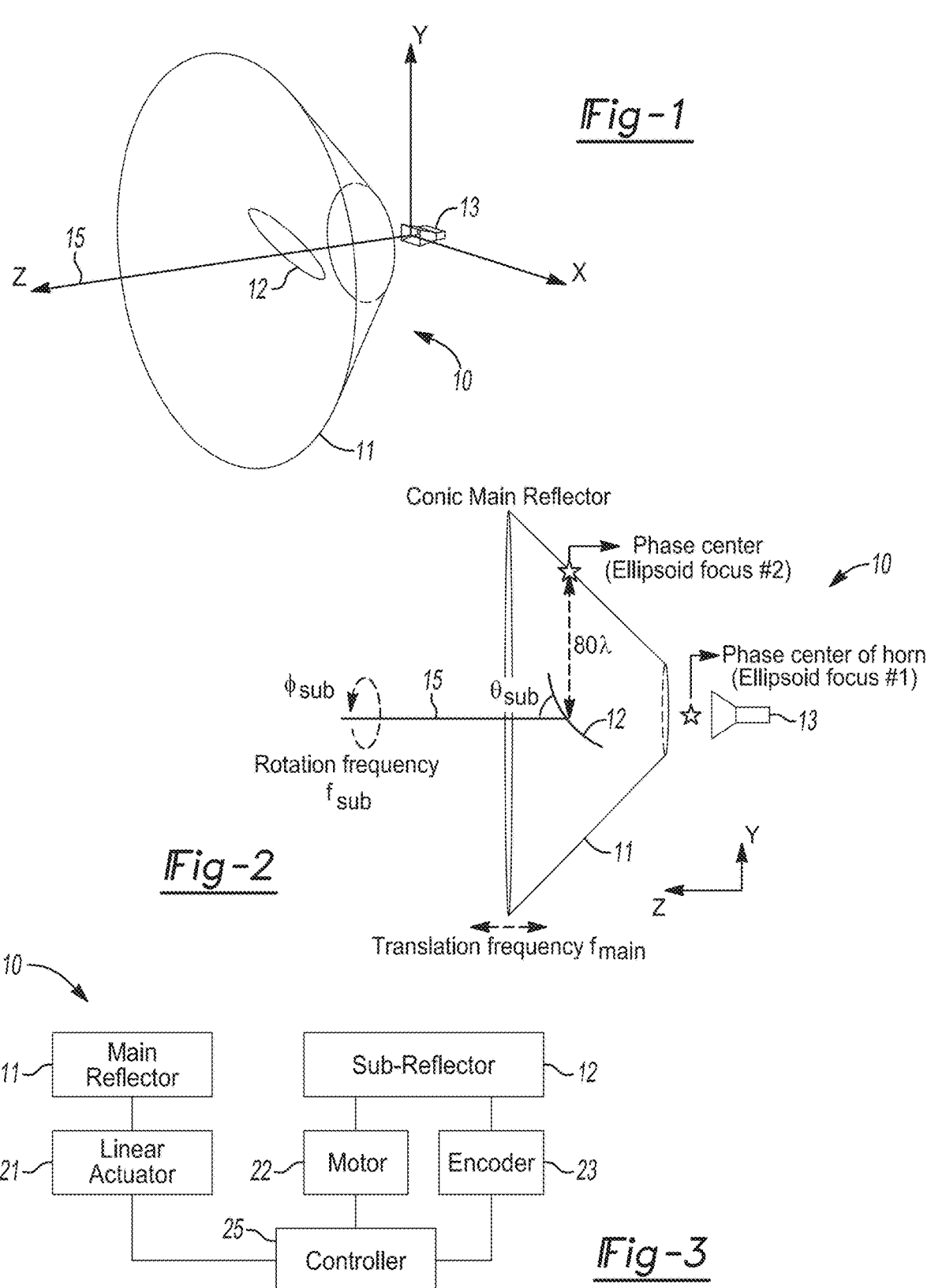
FIG. 1 is a perspective view of a first embodiment of a dual reflector antenna system.
FIG. 2 is a side view of the first embodiment of a dual reflector antenna system.
FIG. 3 is a block diagram for the dual reflector antenna system.
Figure 4:
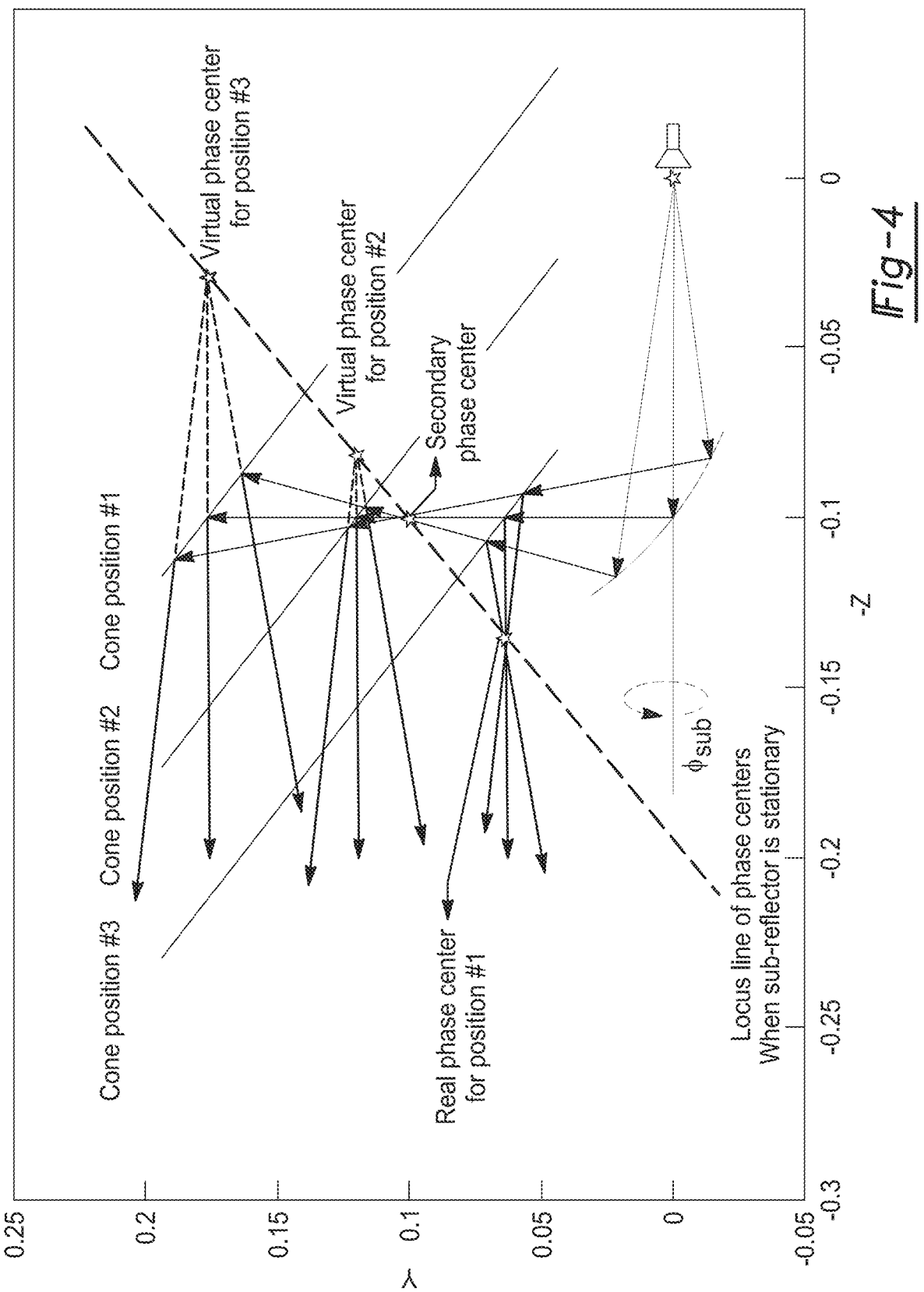
FIG. 4 is a diagram illustrating the operation of the first embodiment of the dual reflector antenna system at different positions.

Example embodiments will now be described more fully with reference to the accompanying drawings.

Breaking the trade-off described above entails achieving the spatial resolution of an N×N phased array with a single element while maintaining the image formation time on the order of milliseconds. The proposed dual reflector antenna is a step in that direction as it uses a single transceiver element and has an image acquisition time on the order of seconds (with the potential of reducing it to a fraction of a second). It fundamentally relies on the convergence of two insights, the first is the subtle fact that SAR imaging does not require displacing the entire antenna but merely the phase center of the antenna. The second insight follows almost immediately from the first, that phase centers can be moved to arbitrary locations using geometrical optics (i.e., with ellipsoidal reflectors). Therefore, by using an ellipsoidal reflector, the phase center can be moved from one of it's foci to the other and then be redirected by a main reflector to illuminate the scene. The sub-reflector can then be rotated about an axis to generate a synthetic circular array that acts as a SAR system.

Although mechanically actuated dual reflector antennas have been studied, this disclosure presents a mechanically actuated dual reflector antenna for synthetic array generation and 4D imaging. There are two key differences between this work and other dual reflector antennas studied in the literature. Firstly, unlike other dual reflectors, the one proposed here is designed to diverge the beam rather than to collimate it. This leads to a larger scanning range (or FOV) for performing digital beamforming. Secondly, and more importantly, the proper functioning of this system relies on precisely modelling and controlling the far-field phase for each position of the sub-reflector and main reflector. As will be shown below, several design constraints are imposed to ensure that the far-field phase can be accurately modelled to allow digital beamforming. This approach to modelling and controlling the far-field phase using a dual-reflector antenna to perform SAR is entirely novel in both conception and design methodology.

FIGS. 1-4 depict an example embodiment of the dual reflector antenna system 10. The dual-reflector antenna is comprised generally of: a main reflector 11; and a sub-reflector 12. In the example embodiment, the main reflector 11 has the shape of a cone formed around a principle axis 15 although other shapes are contemplated by the broader aspects of this disclosure. The main reflector 11 is configured to translate in relation to the sub-reflector 12 along the principle axis. In one example, the main reflector is translated using a linear actuator 21.

The sub-reflector 12 is arranged within the cone of the main reflector and along the principal axis of the main reflector. The sub-reflector 12 has a shape that defines two foci for electromagnetic radiation incident thereon and is configured to rotate about the principal axis. In one example, sub-reflector has shape of an ellipsoid, where the ellipsoid of the sub-reflector defines a major axis and the major axis of the sub-reflector is tilted forty-five degrees with respect to the principal axis of the main reflector. Other shapes for the sub-reflector are envisioned by this disclosure.

With reference to FIG. 3, the sub-reflector 12 is drivably coupled to and rotated by a motor 22. An encoder 23 (e.g., an optical encoder) may be used to measure the rotation of the sub-reflector 12. In addition to the linear actuator 21, the motor 22 and the encoder 23 are in data communication with a controller 25. In an exemplary embodiment, the controller 25 is implemented as a microcontroller. It should be understood that the logic for the control of the antenna system can be implemented in hardware logic, software logic, or a combination of hardware and software logic. In this regard, controller 25 can be or can include any of a digital signal processor (DSP), microprocessor, microcontroller, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC). When it is stated that controller 25 performs a function or is configured to perform a function, it should be understood that controller 25 is configured to do so with appropriate logic (such as in software, logic devices, or a combination thereof).

The dual reflector antenna is fed by a feed horn 13. The feed horn 13 is preferably disposed along the principal axis at one of the two foci and operates to guide electromagnetic radiation towards the sub-reflector 12. It is to be understood that only the relevant components of the antenna system are discussed in relation to FIGS. 1-4, but that other components may be needed to implement the overall system.

For a single position of the sub-reflector 12 and main reflector 11, the electromagnetic radiation emanating from the horn source reflects off of the sub-reflector and main reflector respectively, to be radiated outward along the boresight direction. The final solid angle over which this radiation occurs is called the illuminated region. This radiation then hits the target and the backscatter reaches the antenna to be reflected by the main reflector 11 and then the sub-reflector 12 to finally be detected by the source. Here the magnitude and phase of the received electric field are measured by the controller. The phase is measured with respect to the transmitted signal. As the sub-reflector 12 rotates and the main reflector 11 translates, several such measurements are taken and co-processed to form a synthetic aperture. Combining all the measurements of the synthetic aperture produces a synthetic beam.

Next, the phase of each measurement is used in a post processing step to focus the synthetic beam along different azimuthal and elevation angles. This synthetic beam is then swept along the entire illuminated region to create an image. Each pixel of the image corresponds to each angle along which the synthetic beam was focused. The resolution of the image is directly related to the beamwidth of the synthetic beam. Increasing the size of the main reflector can provide a narrower synthetic beam and hence a higher resolution. To avoid false positives in the detection of targets, the side-lobe levels of the synthetic beam need to be minimized. This is achieved by translating the main reflector over a larger distance. This produces a synthetic aperture with a smaller inner radius which gives lower side-lobe levels. This is the purpose for translating the main reflector. The size of the image depends on the size of the illuminated region. To illuminate a larger scene, one needs a broader radiation pattern coming off of the main reflector. This is achieved by controlling the curvature of the main reflector and subreflector or by the beamwidth of the horn source.

Figures 5A, 5B:
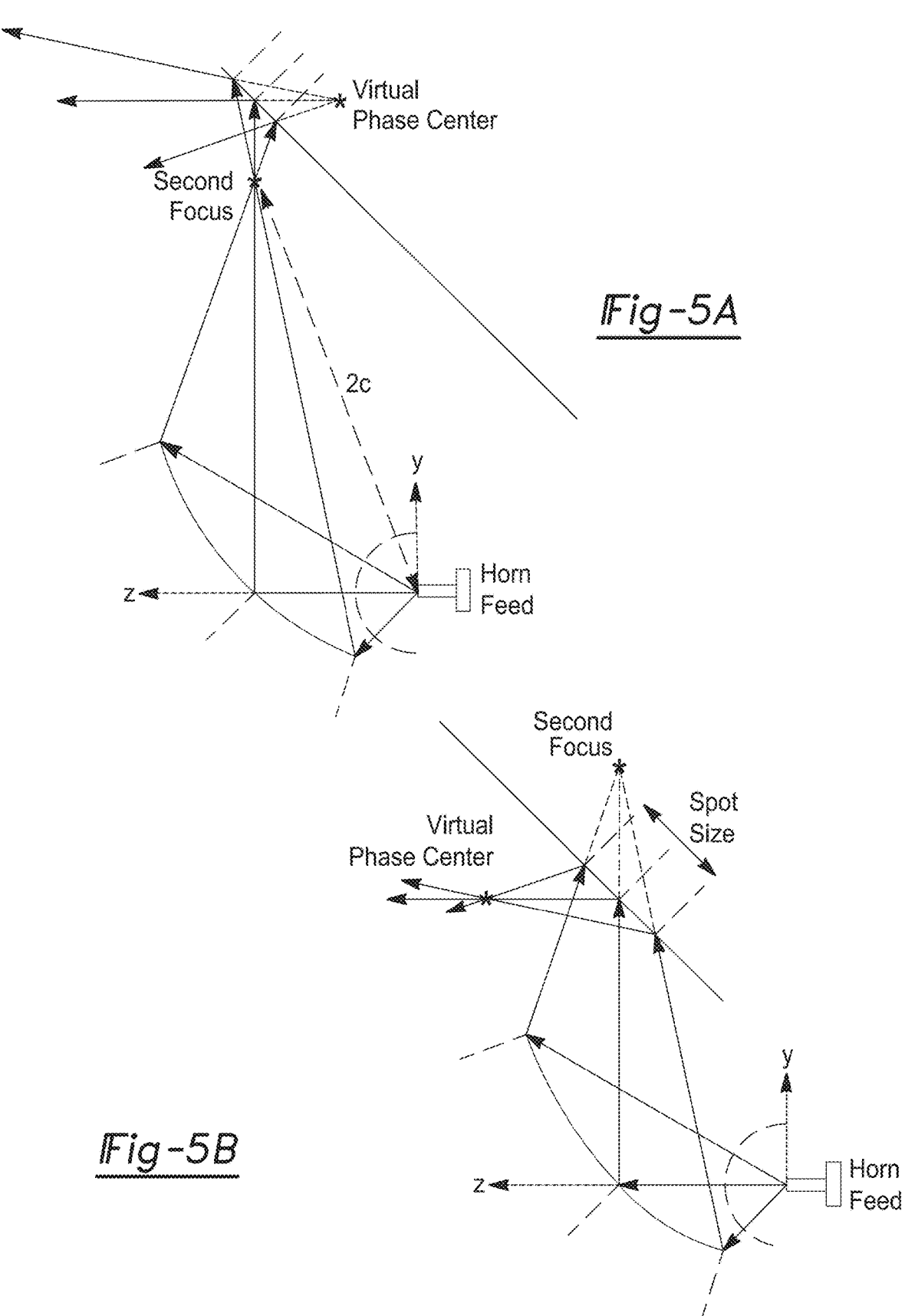
FIGS. 5A and 5B are diagrams illustrating geometrical optics showing the formation of the second focus (and the virtual phase center) as the main reflector is translated in z direction; the rays shown correspond to the −10 dB emanating from the horn feed.

With reference to FIGS. 5A and 5B, the goal of geometrical optics (GO) is to get a first order approximation of the reflector geometries based on ray tracing. Let one assume the horn feed is pointed along the z-axis with the phase center of the horn placed at the origin. Then a trivial choice for the sub-reflector geometry is a planar reflector that is tilted at 45° with respect to z-axis and rotated in azimuth. However, such a sub-reflector produces a large illumination area on the main reflector which increases the size of the main reflector. It also causes the H-plane virtual phase center to diverge from the E-plane virtual phase center due to the φ-curvature of the main reflector. These effects are quite undesirable and can be overcome by an ellipsoidal sub-reflector geometry as explained below.

The ellipsoid of interest (more technically a spheroid) is a body of revolution formed by rotating an ellipse around it's major axis. It has two foci. One of the it's foci is placed on the horn phase center and the other focus is at a distance 2c away from the first focus. All the rays emerging from the first focus (i.e. horn phase center) converge at the second focus with the same path length. This generates a second phase center at the second focus. Note that the sub-reflector must be in the far-field of the horn feed for geometrical optics to be valid. This produces a considerably smaller spot size on the main reflector which leads to a smaller main reflector size. The second major advantage is that since the second focus is close to the main reflector surface, it "sees" a much smaller curvature which reduces separation between the E-plane and H-plane virtual phase centers.

The two free parameters for an ellipse can be chosen to be it's eccentricity e and the half-distance between the foci c. Here, e and c were optimized based on two constraints. For the entire translation range of the main-reflector, the spot size was calculated and the average value was minimized while maintaining the sub-reflector beyond the far-field distance. This reduces the size of the main reflector and increases efficiency since nearly all the power reaching the main reflector is reflected into the far-field.

Another important consideration is the far-field phase. Since SAR image formation relies on precise knowledge of the far-field phase from each virtual phase center, it is essential to eliminate all other paths of radiation into the far-field. The first path to consider is the field diffracted from the edges of the sub-reflector. To minimize this, the sub-reflector is chosen large enough such that the currents on it's edges are at least 10 dB lower than the maximum current. This strict requirement improves efficiency and eliminates the far-field phase error but limits the imaging field of view since the horn beamwidth needs to be reduced to meet this constraint.

The next path to mitigate is the direct ray that goes from the horn to the main reflector and to the far-field. This "single-bounce" path is significant if the side-lobe levels of the horn feed are large. To mitigate this effect, a dual mode Potter Horn is chosen as the feed. This horn has no sidelobes and a symmetric. The Potter Horn also has a stable phase center for all plane cuts, which is another important requirement for achieving accurate far-field phase. Finally, inter-reflector coupling and edge diffraction from the main reflector are eliminated by the small spot size on the main reflector. This leaves us with the main "double-bounce" desired path and it will be shown below that indeed this is the only contribution to the far-field radiation.

Moving on to the main reflector design, the only constraint is φ-symmetry, which must be maintained in order for all the beams (i.e. when the sub-reflector is rotated) to be aligned and to overlap along boresight. Three choices that are immediate are conic, parabolic and spherical geometries. In the parabolic and conic options are proposed, of which the conic main reflector is manufactured due to ease of fabrication. It is important to keep in mind that the size of the main reflector is almost 150λ and requires a tolerance of less than 0.125λ to preserve the far-field phase. This is a very challenging constraint and manufacturing a parabolic or spherical reflector requires sophisticated machining at 77 GHz. These geometries become more realistic and affordable to machine at higher frequencies. Due to this reason, a conic main reflector was chosen and manufactured using a relatively simple process.

Figures 6A, 6B:
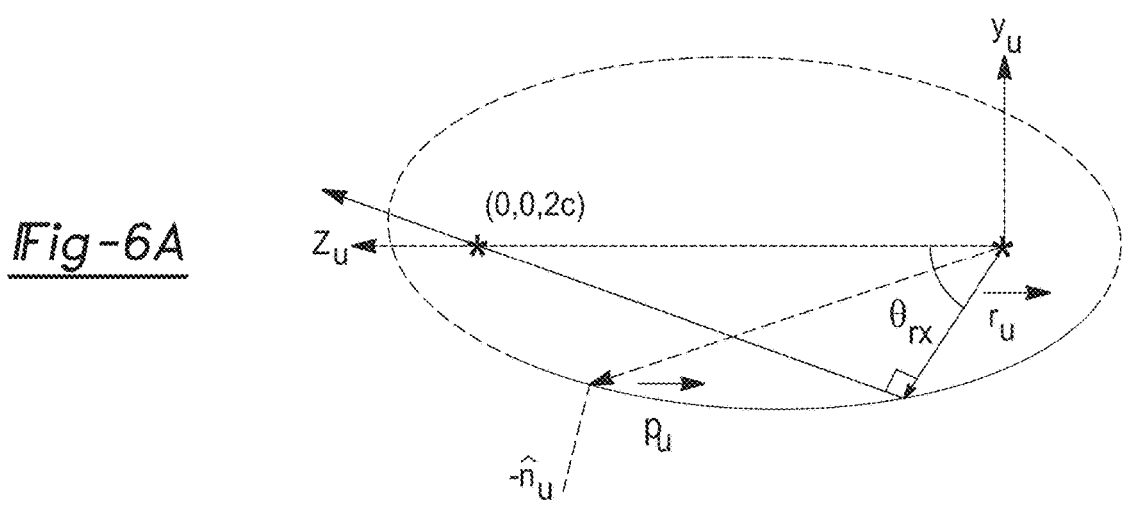
FIGS. 6A and 6B are diagrams illustrating an un-rotated u-coordinate system and the global s-coordinate system, respectively, shown along with the position vectors, unit normal and the main ray path.

Assume the global coordinate system is labelled with the subscript s. In this s-coordinate system, the sub-reflector is first tilted about the x-axis by a certain angle $(\theta_{rx})$ and then rotated by an angle $\gamma_z$ about the z-axis as seen in FIGS. 6A and 6B. $\gamma_z$ is the rotation angle that generates the synthetic circular array. Here, $\theta_{rx}$ is to be determined and $\gamma_z$ is a variable. It is easiest to define the sub-reflector surface in an un-rotated coordinate system. Lets label this un-rotated coordinate system with the subscript u. Consider the following vector definitions:

$\vec{p}_s$ is a position vector on the sub-reflector given by $(r_s, \theta_s, \phi_s)$.

$\vec{p}_m$ is a position vector on the main reflector given by $(r_m, \theta_s, \phi_m)$.

$\vec{p}_d$ is the position vector of the main reflector cone vertex which varies as the main reflector is translated. It is given by $(0, 0, p_d)$.

$\hat{n}_s$ is the inward facing normal on the sub-reflector where $\vec{p}_s$ is pointed.

$\hat{n}_m$ is the inward facing normal on the main reflector where $\vec{p}_m$ is pointed.

$\vec{p}_u$ is a position vector on the sub-reflector in the un-rotated coordinate system. It is given by $(r_u, \theta_u, \phi_u)$.

$\hat{n}_u$ is the inward facing normal on the sub-reflector in the un-rotated coordinate system.

$\vec{r}_{sh}$ is the main ray from the horn feed to the sub-reflector along which the beam maximum lies.

$\vec{r}_{ms}$ is the main ray after reflection from the sub reflector.

$\vec{r}_{fm}$ is the main ray after reflection from the main reflector. This ray must be pointed along boresight.

$\vec{r}_u$ is the main ray from the horn feed to the sub-reflector in the un-rotated coordinate system.

The equation of an ellipsoid (more precisely a spheroid) with width $2a$, height $2b$ and centered at one of it's foci, oriented along the $z_u$-axis is given by:

$$\frac{x_u^2 + y_u^2}{b^2} + \frac{(z_u - c)^2}{a^2} = 1 \tag{1}$$

Since e and c are already fixed, a and b are given by:

$$a = \frac{c}{e} \text{ and } b = a\sqrt{1 - e^2} \tag{2}$$

It then follows that when e is greater than 0.7071 there exists a ray that reflects off the sub-reflector at 90°. After some elementary trigonometry it can be shown that this ray occurs at an angle $\theta_{rx}$ with respect to the $z_u$-axis. Where, $$\theta_{rx} = 90° - \frac{1}{2}\arcsin\left(\frac{b^2}{c^2}\right) \tag{3}$$

From Eqs. (2) and (3), it is easily shown that when e is less than 0.7071, $\theta_{rx}$ is complex (i.e. does not exist). The reason for labelling this angle $\theta_{rx}$ (which was already defined earlier) is that this is precisely the angle by which the sub-reflector needs to be tilted about the x-axis in order for the main ray coming out of the horn feed to exit the main reflector along boresight after a "double bounce". Using Eq. (1) the sub-reflector surface can be re-described by specifying $r_u$ as a function of $\theta_u$ and $\phi_u$ as follows:

$$r_u = \frac{a(1 - e^2)}{1 - e\cos\theta_u} \tag{4}$$

Note that it is not a function of $\phi_u$ since the spheroid is oriented to be a body of revolution in $\phi_u$. Now sweeping $\theta_u$ and $\theta_u$, the position vector $\vec{p}_u$ describes the surface of the ellipsoid. For a given $\vec{p}_u$, the corresponding inward facing normal $\hat{n}_u$ is determined as follows:

$$\hat{n}_u = \frac{\vec{r}_{\theta u} \times \vec{r}_{\phi u}}{\vec{r}_{\theta u} \times \vec{r}_{\phi u}} \tag{5}$$

Where, $$\vec{r}_{\theta u} = \frac{\partial \vec{r}_u}{\partial \theta_u} = \left(\frac{\partial x_u}{\partial \theta_u}, \frac{\partial y_u}{\partial \theta_u}, \frac{\partial z_u}{\partial \theta_u}\right)$$

$$\frac{\partial x_u}{\partial \theta_u} = \frac{\partial r_u}{\partial \theta_u}\sin\theta_u\cos\phi_u + r_u\cos\theta_u\cos\phi_u$$

$$\frac{\partial y_u}{\partial \theta_u} = \frac{\partial r_u}{\partial \theta_u}\sin\theta_u\sin\phi_u + r_u\cos\theta_u\sin\phi_u$$

$$\frac{\partial z_u}{\partial \theta_u} = \frac{\partial r_u}{\partial \theta_u}\cos\theta_u - r_u\sin\theta_u$$

$$\frac{\partial r_u}{\partial \theta_u} = \frac{ae(e^2 - 1)\sin\theta_u}{(1 - e\cos\theta_u)^2} \text{ and } \frac{\partial r_u}{\partial \phi_u} = 0$$

$$\vec{r}_{\phi u} = \frac{\partial \vec{r}_u}{\partial \phi_u} = \left(\frac{\partial x_u}{\partial \phi_u}, \frac{\partial y_u}{\partial \phi_u}, \frac{\partial z_u}{\partial \phi_u}\right)$$

$$\frac{\partial x_u}{\partial \phi_u} = -r_u\sin\theta_u\sin\phi_u$$

$$\frac{\partial y_u}{\partial \phi_u} = r_u\sin\theta_u\cos\phi_u$$

$$\frac{\partial z_u}{\partial \phi_u} = 0$$

Now that the position vector and the corresponding normal are described on the surface of an ellipsoid in the u-coordinate system, the desired sub-reflector can be described in the s-coordinate system. Start by considering the unit direction vector $\vec{p}_s$ which is swept in $\theta_s$ and $\phi_s$ to cover the −10 dB beam radiated by the horn feed. The sub-reflector must intersect this beam and therefore rs must be described as a function of $\theta_s$ and $\phi_s$. Doing this requires going to the u-coordinate system where the ellipse equations are defined and then coming back to the s-coordinate system. Introducing the corresponding rotation matrices $R_z$ and $R_x$, where $R_z$ defines rotation about the $z_s$-axis by $\gamma_z$ and $R_x$ defines rotation about the $x_s$-axis by $\theta_{rx}$. They are given by:

$$R_z = \begin{bmatrix} \cos\gamma_z & \sin\gamma_z & 0 \\ -\sin\gamma_z & \cos\gamma_z & 0 \\ 0 & 0 & 1 \end{bmatrix}$$

$$R_x = \begin{bmatrix} 1 & 0 & 0 \\ 0 & \cos\theta_{rx} & \sin\theta_{rx} \\ 0 & -\sin\theta_{rx} & \cos\theta_{rx} \end{bmatrix}$$

Then $\vec{p}_s$ and $\hat{n}_s$ are obtained by the following steps:

$$\hat{p}_u = \frac{R_x^{-1}R_z^{-1}\hat{p}_s}{\left|R_x^{-1}R_z^{-1}\hat{p}_s\right|} \tag{6}$$

Eqs. (4) and (5) can be used to find $\vec{p}_u$ and $\hat{n}_u$. These vectors must be rotated back to the s-coordinate system to find $\vec{p}_s$ and $\hat{n}_s$ as follows:

$$\vec{p}_s = R_z R_x \vec{p}_u \text{ and } \hat{n}_s = R_z R_x \hat{n}_u \tag{7}$$

Care must be taken to apply the rotation matrices in the correct order as they are not commutative. Finally, the framework to describe the ray-model is complete. Since ray vectors are specific cases of the position vectors, the formulation for a single ray is described, which can be trivially extended to a set of rays. Consider the boresight ray $\vec{r}_{sh}$ defined above. Assuming $\vec{r}_{sh} = \hat{p}_s$ and using Eqs (6), (4), (5) and (8), $\vec{r}_{sh}$ and $\hat{n}_{sh}$ are obtained. Using Snell's law of reflection, the unit reflected ray is found by:

$$\hat{r}_{ms} = \frac{\vec{r}_{sh} - 2(\vec{r}_{sh} \cdot \hat{n}_{sh})\hat{n}_{sh}}{|\vec{r}_{sh} - 2(\vec{r}_{sh} \cdot \hat{n}_{sh})\hat{n}_{sh}|} \tag{8}$$

The magnitude of $\vec{r}_{ms}$ remains to be found. Let $\vec{p}_m$ denote the position vector on the main reflector where $\vec{r}_{ms}$ hits the main reflector. Then consider the vector $\vec{p}_{tm} = \vec{p}_m - \vec{p}_d$. This vector originates at the main reflector vertex and ends at the point where the ray $\vec{r}_{ms}$ hits the main reflector. It's components $r_{tm}$ and $\phi_{tm}$ are the only unknowns since $\theta_{tm}$ is the cone angle. Then note that the following vector equation holds true:

$$\vec{r}_{sh} + \vec{r}_{ms} - \vec{p}_m = \vec{p}_d + \vec{p}_{tm} \tag{9}$$

This vector equation is a system of three equations which can be solved for the unknowns $|\vec{r}_{ms}|$, $r_{tm}$ and $\phi_{tm}$. Thus, the ray $\vec{r}_{ms}$ and it's corresponding position vector $\vec{p}_m$ are obtained. The corresponding unit normal is given by:

$$\hat{n}_m = -\frac{(\vec{p}_m - \vec{p}_d) \times \vec{r}_{\phi m}}{|(\vec{p}_m - \vec{p}_d) \times \vec{r}_{\phi m}|} \tag{10}$$

Where $\vec{r}_{\phi m}$ is analogous to $\vec{r}_{\phi u}$ from Eq. (5) with the subscript u replaced by m appropriately. Similarly, the final ray $\vec{r}_{tm}$ can be obtained using equations analogous to Eq. (9) and (10) with a far-field position vector of choice. Once the rays are determined, the far-field magnitude and phase can be obtained rather trivially using the free space Green's Function $e^{ikr}/(4\pi r)$, where $r = |\vec{r}_{sh}| + |\vec{r}_{ms}| + |\vec{r}_{fm}|$.

In the design of reflector antennas, the Physical Optics (PO) formalism is the most widely used analysis technique. The reason for developing an analytical model rather than relying on a simulation based design approach is due to the large electrical size of the reflectors and the number of positions of the main reflector and sub-reflector. Each position of main reflector and sub-reflector correspond to a single synthetic array element and hence a single simulation. It is important to note that although the rotation of the sub-reflector is symmetric about the z-axis, the far-field generated from one position cannot simply be rotated to obtain that from a different sub-reflector angle. This is due to the fact that the polarization of the horn feed is linear and not radial. Therefore, the system does not have $\phi$-symmetry. This lack of $\phi$-symmetry is a necessary condition for the far-field polarization to remain unchanged as the sub-reflector rotates. The sufficient condition for the polarization to be preserved is that the two reflectors are approximately planar over the illumination region. This condition is met by the main ray and therefore, along the boresight the far-field polarization should be independent of the sub-reflector rotation angle $\gamma_z$. Lets establish this by considering the main ray and assuming the polarization to be along $\hat{\gamma}$ without loss of generality (since the sub-reflector rotates in $\phi$). Letting $\hat{E}_{sh} = \hat{\gamma}$ denote the incident polarization on the sub-reflector, the unit normal vector seen by the main ray is given by:

$$\hat{n}_{sh} = \frac{1}{\sqrt{2}} \sin\gamma_z \hat{x} + \frac{1}{\sqrt{2}} \cos\gamma_z \hat{y} - \frac{1}{\sqrt{2}} \hat{z} \tag{11}$$

Applying the boundary condition ($E_{tangential} = 0$), the polarization of the first reflected ray is found to be:

$$\hat{E}_{ms} = 2(\hat{E}_{sh} \cdot \hat{n}_{sh})\hat{n}_{sh} - \hat{E}_{sh} \tag{12}$$

$$= \sqrt{2} \cos\gamma_z \hat{n}_{sh} - \hat{y}$$

The unit normal vector on the main reflector as a function of $\gamma_z$ is given by $\hat{n}_{ms} = -\hat{n}_{sh}$. Applying the boundary conditions (analogous to Eq. (12)) and simplifying the algebra yields the final polarization exiting the main reflector as $\hat{\gamma}$. This is a remarkable result as it allows full polarimetric capability which is unprecedented in very high-resolution radars. This polarization preserving nature along boresight is clearly shown in the measurements discussed below.

In order to verify the beamforming capability of this antenna system, the far-field electric fields for each position of the sub-reflector and main reflector must be solved for. Using the physical optics solver in ANSYS HFSS, each solution takes approximately 6 hours using 4 cores. Consider three circular arrays, each having an element spacing of 5 degrees in $\gamma_z$, then the simulation of all 216 elements would take 54 days. Even after exploiting the symmetries in X and Y, the time taken would be around 13 days which is unrealistic to perform any optimization routines. Another useful advantage of using an analytical approach is that the far-field contribution from each of the paths can be isolated. More explicitly, one can calculate the contribution of the desired "double-bounce" path alone and compare it with the PO simulation done in HFSS which includes all paths and secondary effects. The design can then be optimized to minimize the difference between the two approaches for a single position of the sub-reflector and main reflector. This is an extremely useful design approach especially when the far-field phase is concerned. It optimizes for the far-fields to be purely generated by the desired "double-bounce" path, thus making the far-field phase computable with GO or PO.

The PO model developed below refers to the definitions and equations for the position vectors, unit normals and rotation matrices defined above and referenced in FIGS. 6A and 6B. Start by defining the fields on the horn aperture to be $\vec{H}_h(\vec{p}_h)$. These fields can be extracted from HFSS or can be computed analytically depending on the Horn feed being used. Then the equivalent electric currents on the horn aperture are given by:

$$\vec{J}_h(\vec{p}_h) = 2(\hat{z}_s \times \vec{H}_h(\vec{p}_h)), \tag{13}$$

where $\vec{p}_h$ is the position vector on the horn aperture in the s-coordinate system. Using the free space Green's Function and the far-field approximation, the magnetic fields on the sub-reflector are given by:

$$\vec{H}_s(\vec{p}_s) = -ik \frac{e^{ikr_s}}{4\pi r_s} \int\int_{sh} (\vec{J}_h(\vec{p}_h) \times \hat{p}_s) e^{-ik\vec{p}_h \cdot \hat{p}_s} d\hat{s}_h \tag{14}$$

Note that here the $e^{-i\omega t}$ time convention is used. The equivalent sub-reflector currents are given by the PO approximation:

$$\vec{J}_s(\vec{p}_s)=2(\hat{n}_s\times\vec{H}_s(\vec{p}_s)) \tag{15}$$

These currents illuminate the main reflector with magnetic fields given by:

$$\vec{H}_m(\vec{p}_m) = -ik\int\int_{S_s}\frac{e^{ik|\vec{p}_{sm}|}}{4\pi|\vec{p}_{sm}|}\left(\vec{J}_s(\vec{p}_s)\times\frac{\vec{p}_{sm}}{|\vec{p}_{sm}|}\right)d\vec{s}_s, \tag{16}$$

where $\vec{p}_m=\vec{p}_m-\vec{p}_s$. The corresponding main reflector currents are given by:

$$\vec{J}_m(\vec{p}_m)=2(\hat{n}_m\times\vec{H}_m(\vec{p}_m)) \tag{17}$$

Finally the far-field electric field is obtained using:

$$\vec{E}_f(\vec{r}_f) = -ikn\frac{e^{ikr_f}}{4\pi r_f}\int\int_{S_m}\left(\vec{J}_m(\vec{p}_m)\times\hat{p}_f\right)\cdot e^{-ik\vec{p}_m\cdot\hat{p}_f}d\vec{s}_m, \tag{18}$$

where $\vec{p}_f=(r_f, \theta_f, \phi_f)$ is the far field position vector at which the fields need to be computed. Note that Eq. (17) does not use the far-field approximation, this is necessary since the sub-reflector is large and the origin is displaced significantly from the sub-reflector. Using the equations developed above for the reflector geometries, the surfaces are discretized into a uniform mesh with $\lambda/8$ spacing between the mesh points. Plotting the sub-reflector currents would reveal that the maximum is shifted off the z-axis since all points on the sub-reflector are not equidistant from the horn feed. To mitigate this effect the sub-reflector is moved further away by a small distance. Another solution to this issue is to change the cone angle to compensate for this offset.

A related observation from the sub-reflector currents is that they are lower in magnitude on the side of the sub-reflector further away from the horn (i.e. $\theta_s=45°$ and $\phi_s=90°$ than they are on the side that is closer to the horn (i.e. $\theta_s=45°$ and $\phi_s=)-90°$. Again this is due to the tilt of the sub-reflector. The side further away from the horn is the side that interferes more strongly with rays emanating from the main reflector (regardless of the sub-reflector rotation). This interference increases when the main reflector is translated all the way out in z (i.e. when $p_d$ is minimum) and is undesirable. It can be reduced by truncating the sub-reflector on the interfering side while still maintaining a −10 dB current taper on the edges. Note that this makes the upper bound of $\theta_s$ a function of $\phi_s$ and can be chosen based on the desired current taper on the edge.

As mentioned earlier, the Analytical PO model is developed not only to speed up the simulation time but also to isolate out the desirable "double-bounce" path form all other multipath components. Isolating this "double-bounce" path from the other paths is not easily doable in HFSS. To verify that all undesirable paths are negligible, it is essential to ensure that the HFSS PO solution (which includes all multipath components and secondary effects) matches well with the Analytical PO model developed earlier. The results between the HFSS PO solution and the Analytical PO solution are compared. In the region $\theta=\pm20$ the agreement is excellent. Since beamforming is only being performed in the region $\theta=\pm15$, it is safe to assume that the desirable "double-bounce" path is the only dominant component in this field of view. Outside $\theta=\pm20$ the direct path from the Horn to the far-field causes divergence between the HFSS PO and the Analytical PO pattern. This additional radiation seen outside $\theta=\pm20$ is the energy that was not captured by the sub-reflector. Since it is negligible and well outside the field of view it does not affect the far-field phase.

Figures 7A, 7B:
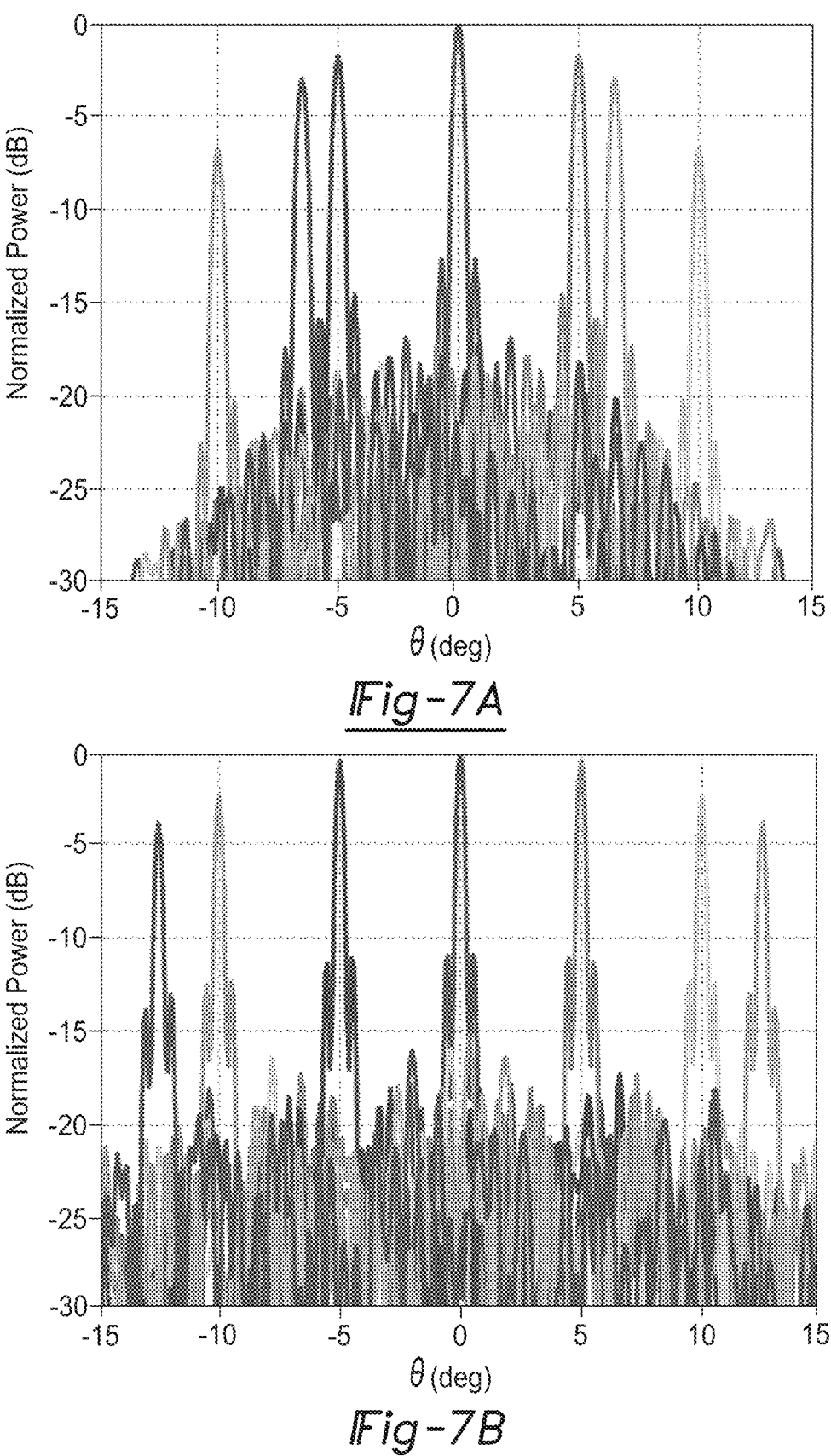
FIGS. 7A and 7B are graphs showing beamforming results from the PO model in E-plane and H-plane, respectively.

Finally, to demonstrate beamforming capability, three positions of the main reflector for $p_d=\{-155\text{ mm}, -117\text{ mm}$ and −39 mm} and 72 positions of the sub-reflector (every 5°) were chosen to form the synthetic array. The Analytical PO model presented earlier was used to find the far-field electric fields and then digital beamforming by phase compensation was used to synthesize the final pencil beams. The results are shown in FIGS. 7A and 7B. Here, the eccentricity of the ellipsoid was chosen to be 0.77 and $c=28.3\lambda$. The half-power beamwidth remains 0.4 degrees for the entire steering range which in this case is 14° in both azimuth and elevation. The reason for the drop off in peak power as the beam is scanned is that the individual element beams are not broad enough. This may be desirable in long range automotive radars since targets on the road are almost always along boresight and off-road targets become less and less important as the beam is steered. For close range and mid-range radars, the narrow field-of-view is a limitation. To overcome this, larger beam divergence is required from each element pattern (i.e. those in FIG. 4). This can be achieved by using a smaller eccentricity value for the ellipsoid. This leads to a larger sub-reflector and main reflector size. To demonstrate this, a sub-reflector with eccentricity $e=0.71$ and $c=28.3\lambda$ was modelled using PO. The beamforming results for this case are shown in FIGS. 8A and 8B. The steering range is 25° in both azimuth and elevation, thus demonstrating that a wide field of view can be achieved by modifying the reflector geometries. The half-power beamwidth is reduced to 0.3°, owing to the larger reflector sizes and broader element beams. Due to limitations in manufacturing capability, this disclosure presents the experimental demonstration of the former case where the eccentricity is 0.77 and the two reflectors are 25% smaller.

As alluded to earlier, in order to achieve synthetic beamforming, the far-field phase must be accurate to within $\lambda/8$ which requires very precise manufacturing when operating at millimeter-wave frequencies. In one example, the Potter Horn was machined at a milling facility, while the sub-reflector and main reflector were fabricated using additive manufacturing and sheet metal cutting.

In one example embodiment, the 3D model of the sub-reflector consists of a reflecting surface, two supporting beams and a hollow cylindrical coupler as shown in FIG. 9. The cylindrical coupler attaches to a motor-bearing-pulley system that rotates the sub-reflector while allowing a fixed waveguide to pass through the hollow inner core and connect to the Potter horn. The two support beams connect to the lower half of the sub-reflector to prevent interference with the reflected rays. Since the support beams also rotate with the sub-reflector, they are never in the path of the reflected rays. This is yet another design novelty to maintain the far-field phase. Traditional dual-reflector antennas can tolerate some blocking from the support beams with only a loss in efficiency but when far-field phase is concerned, any field disturbance is not tolerable.

For this example, the sub-reflector is manufactured using a Snapmaker 2.0 A350 3D printer with ABS (Acrylonitrile Butadiene Styrene) filament. The reason for using ABS filament is that it has the unique property of dissolving in acetone. This is crucial to remove the layer lines that are formed during the printing process. The presence of layer lines leads to significant losses at millimeter wave frequencies. To remove them, the printed sub-reflector was placed in a container filled with warm acetone vapors for an hour. This produces a uniform smoothing of the layer lines on the exposed surfaces without affecting the geometry. Several experiments were carried out to find the optimal vapor concentration, temperature and duration to remove the layer lines and prevent other undesirable effects such as warping and bubbling of the surface. After the layer lines were removed, the curved surface is coated with a conductive silver-coated copper spray to make it reflective. This approach of using a 3D printed structure keeps the weight of the sub-reflector very low, thus allowing high speed rotation without significant torque or vibration.

FIGS. 10A and 10B depict an example embodiment of the main reflector. The main reflector is made of a stainless steel sheet metal embedded in a 3D printed exoskeleton. The sheet metal is cut using a high precision water-jet cutting tool in the shape of an annular arc that is folded to form a cone, which is then inserted into the exoskeleton. The exoskeleton consists of three rings (outer, middle and inner), support brackets and a linear actuator mount. The outer and middle rings are printed in 4 parts and fixed together using screws, while the inner ring is printed in one piece. The outer and inner rings are printed with an angle slit inside which the cone sits to hold it's shape. The middle ring and the support brackets maintain the shape of the cone and prevent it from unwrapping.

Figure 11:
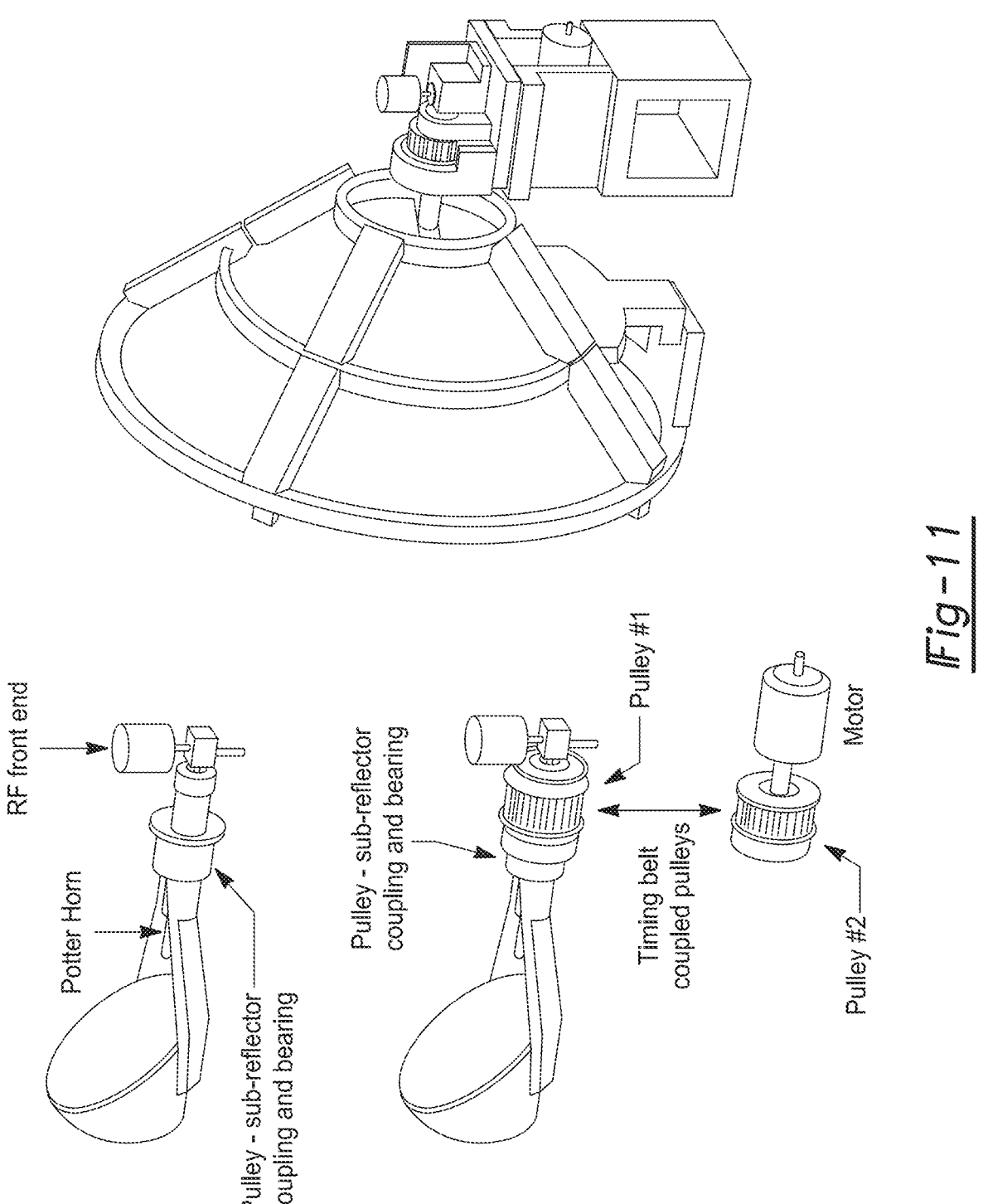
FIG. 11 depicts the example embodiment of the system assembly.

FIG. 11 shows the system assembly for the example embodiment. The RF front end is connected to the Potter Horn using a straight waveguide section that passes through the hollow cylindrical coupler. The cylindrical coupler attaches to a pulley-sub-reflector coupling that connects a pulley (Pulley #1) to the sub-reflector. As the pulley rotates, the sub-reflector and the coupling rotate with it. This structure is suspended by two radial ball-bearings whose inner ring rotates with the pulley and outer ring is fixed to the support structure. Pulley #1 is driven by a timing belt that connects to another pulley (Pulley #2) underneath it. The timing belt provides zero slippage and very high coupling resolution as compared to a geared coupling. Pulley #2 is rotated by a DC motor that is placed in closed loop feedback using an angle encoder. This allows angular resolution down to less than 0.1°. The main reflector is mounted on a ball-screw linear actuator that is controlled by another DC motor and encoder in closed loop feedback.

The radiation pattern of the dual reflector antenna was measured in 2 cuts, E-plane and H-plane. To take the two cuts, the Horn feed is excited by two different polarizations. A 12.4166 GHz signal source is multiplied up to 74.5 GHz, which is then mixed with a Network Analyzer stepped frequency sweep (2-5 GHz) to get a transmitted signal that ranges from 76.5 GHz to 79.5 GHz. A Network Analyzer based measurement setup allows isolation of the direct path between the two antennas by using time gating. Therefore, measurement can be carried out in a multipath environment provided none of the multipaths lie within the range bin of the direct path.

The measured and simulated radiation pattern of the dual reflector and the Potter Horn are compared. In case of the Potter Horn, over the sub-reflector surface (i.e. $\theta=\pm45$), the co-pol pattern is almost identical to the simulated pattern, whereas the cross-pol is higher due to misalignment of the RX standard pyramidal horn. Even with a perfectly linearly polarized horn feed, the dual reflector setup increases the far-field cross-pol due to the main reflector's curvature. To reduce the dual reflector far-field cross-pol, a higher order multi-modal horn can be designed and implemented as the feed.

For the dual reflector case, the radiation pattern measurement is performed and a comparison is made with the HFSS PO pattern for 9 positions of sub-reflector and main reflector that are representative of the entire array. The motor is set to $\gamma_z=\{0°, 45°$ and $90°\}$ and the main reflector is placed at three locations corresponding to $p_d=\{-155$ mm, $-117$ mm and $-39$ mm$\}$. For each position of the sub-reflector and main-reflector, co-pol and cross-pol measurements were taken in E-plane and H-plane.

There is excellent agreement between the simulated pattern and the measured pattern for all 9 cases. These 9 cases are representative of the entire array since they cover one quadrant and the other three quadrants are mirror images of it from XY-symmetry. It is clear that all 9 'elements' have the same polarization. The cross-pol is primarily generated by $\phi$-curvature in the main reflector and therefore only shows up in the cuts that "see" the $\phi$-curvature. That is, in the H-plane cuts when $\gamma_z=0°$ and in the E-plane cuts when $\gamma_z=90°$.

The gains of the dual reflector antenna and the Potter Horn were measured with respect to a standard gain pyramidal horn antenna. The realized gain of the Potter Horn is 0.2 dB less than the simulated value. In case of the dual reflector antenna, for each position, the realized gain is 0.5-0.7 dB less than the simulated value. This loss is ascribed to losses in the sub-reflector conductive paint.

Figure 12:
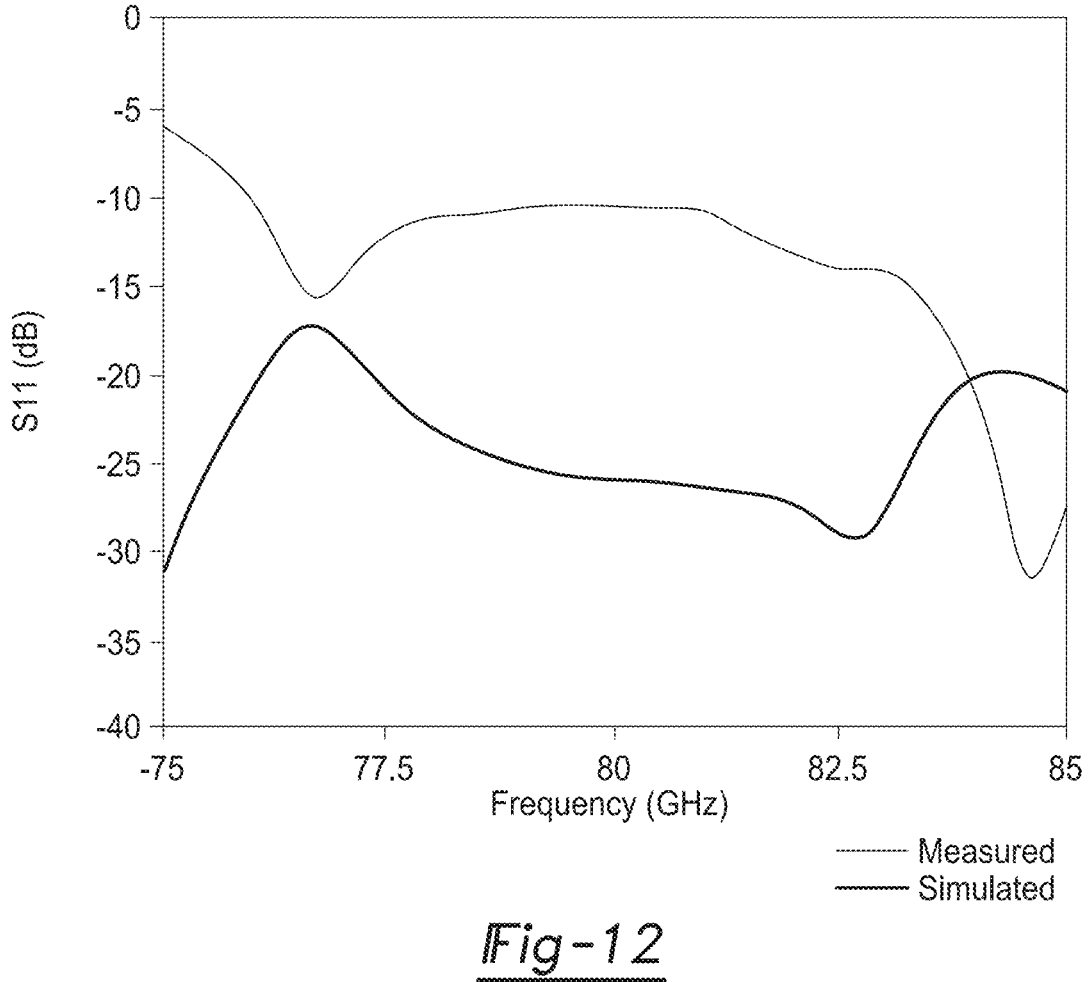
FIG. 12 is a graph showing the measured and simulated return loss of the dual reflector system.

A return loss measurement was performed using a PNA-X Network Analyzer with W-band frequency extenders. The results are shown in FIG. 12. The difference between the simulation and measurement is due to two reasons. Firstly, a rectangular to circular waveguide transition is used to convert the $TE_{10}$ mode of the WR-90 waveguide from the frequency extender to a $TE_{11}$ circular waveguide mode of the Potter Horn input. This transition is not modelled in the simulation and impacts the return loss. Secondly, the waveguide diameters of the Potter Horn input and the transition output are slightly different, which causes a mismatch. The Potter Horn input diameter is 0.015 inches smaller, thereby having a higher cut off frequency. This causes degradation in the matching at lower frequencies (around 75 GHz). However, our band of interest is from 76.5 GHz to 79.5 GHz where the return loss is less than −10 dB. No difference in return loss was found when the sub-reflector was removed, indicating that there is negligible backscatter from the sub-reflector to the Horn. This is very desirable to improve TX-RX isolation in a monostatic radar system.

Figure 13A:
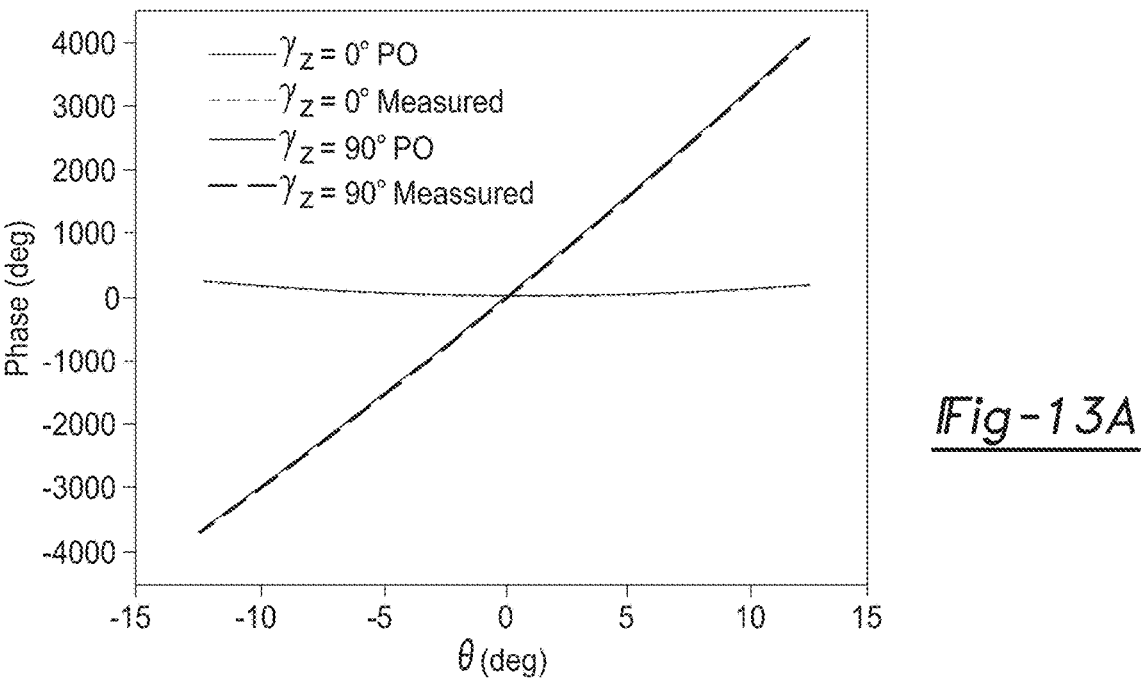
FIGS. 13A and 13B are graphs showing the measured far-field phase and the corrected PO phase.
Figure 13B:
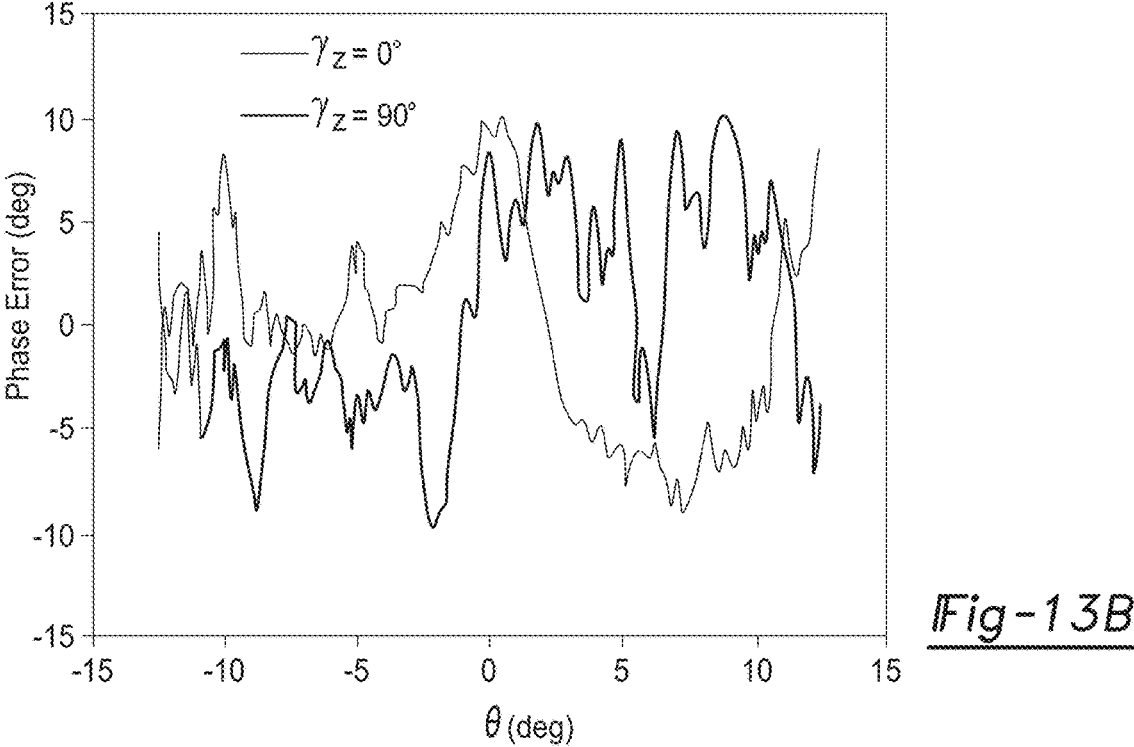
Figure 14A:
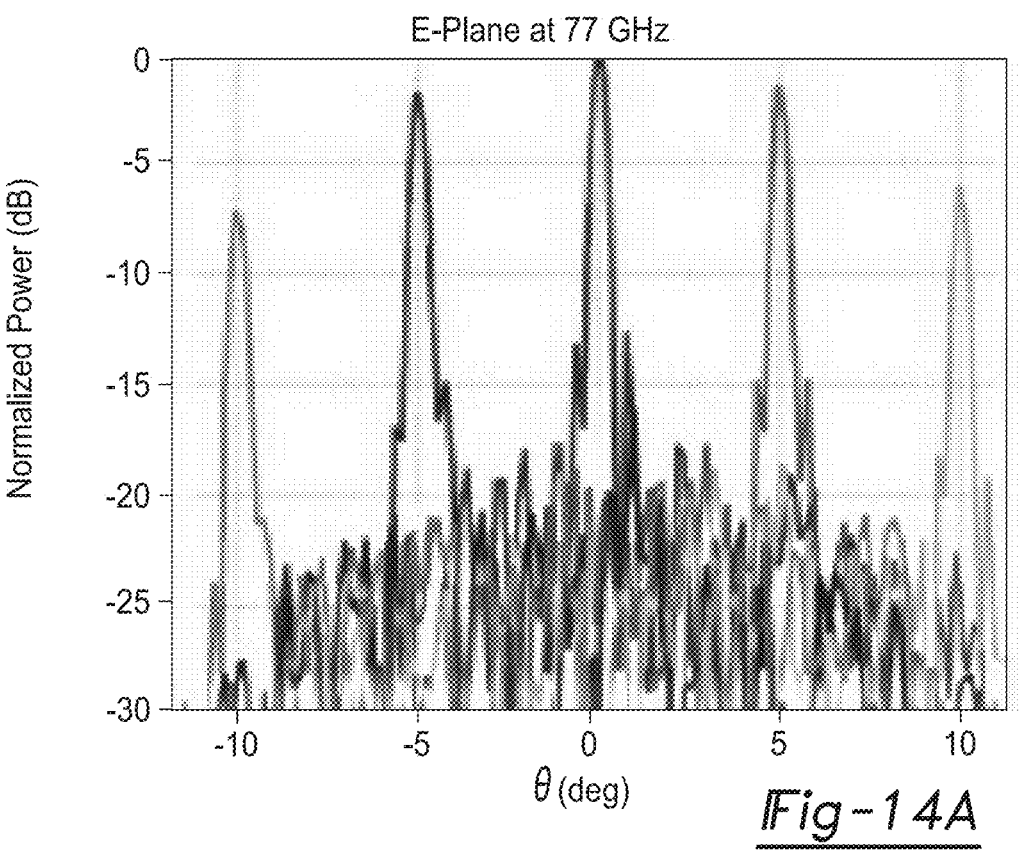
FIGS. 14A-14F are graphs showing beamforming patterns from the measurement results in the E-plane and the H-plane at three different frequencies.
Figure 14B:
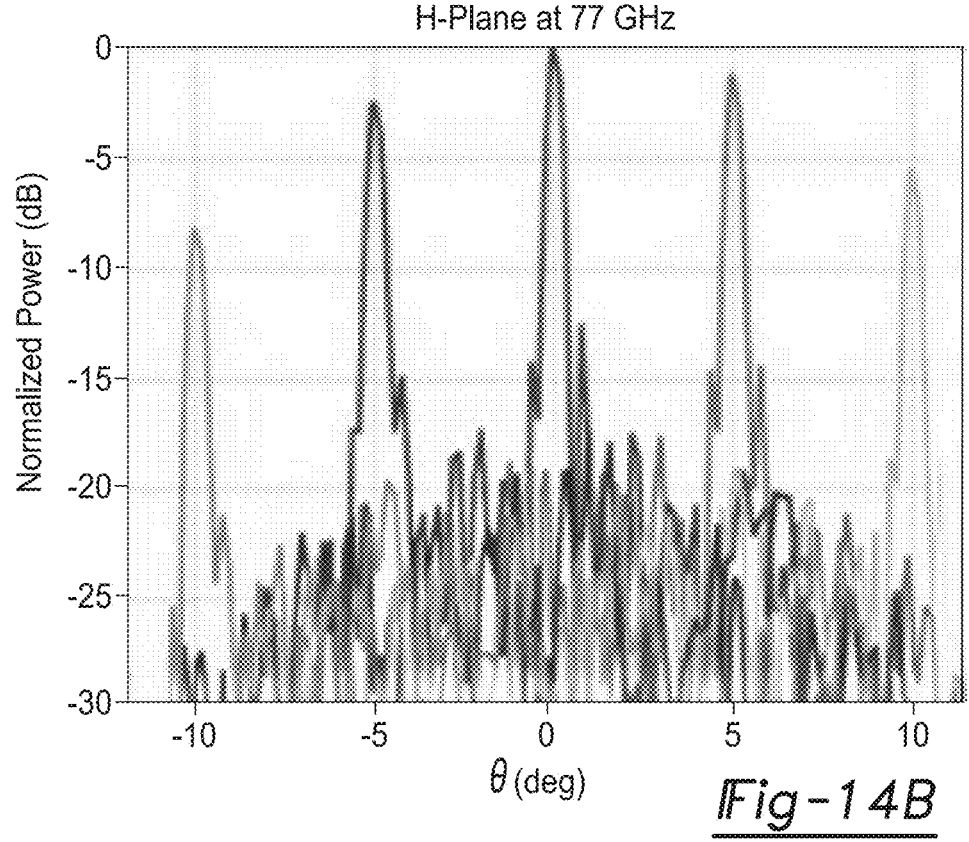
Figure 14C:
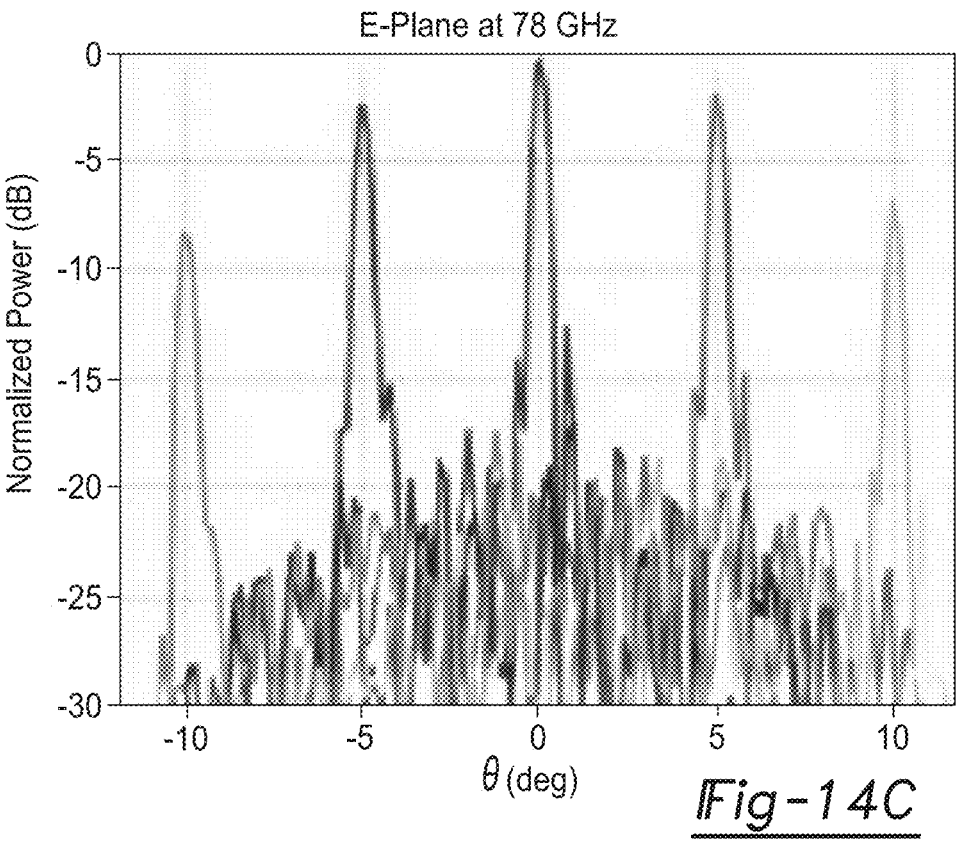
Figure 14D:
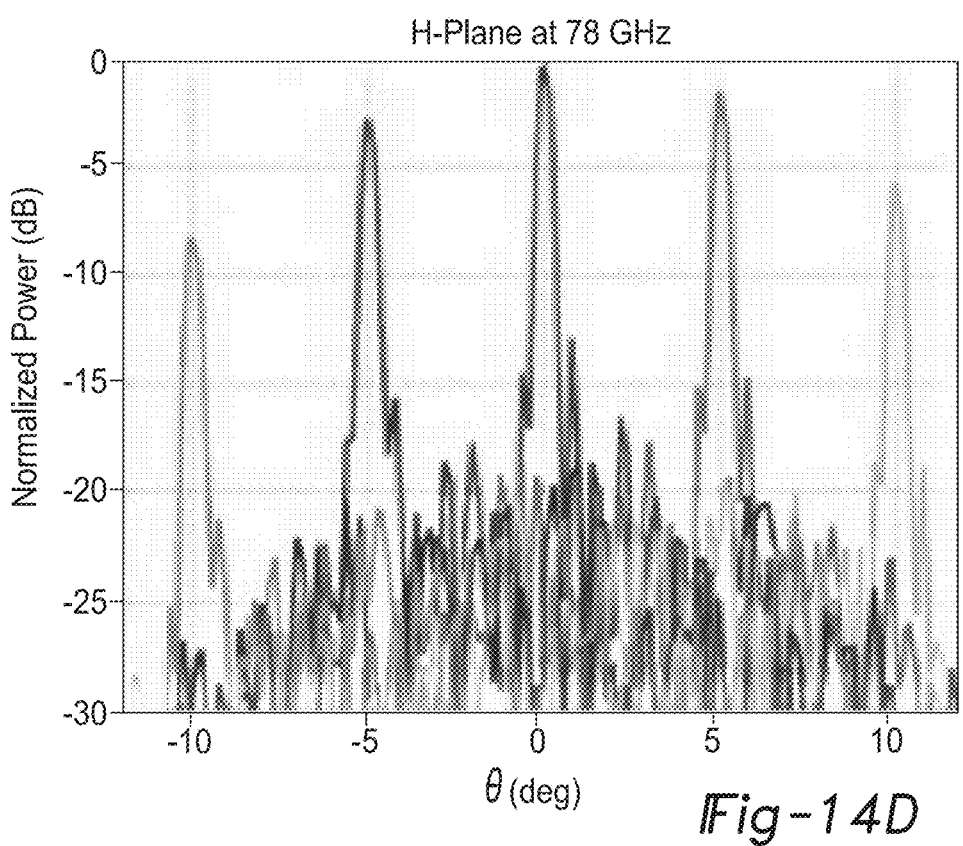
Figure 14E:
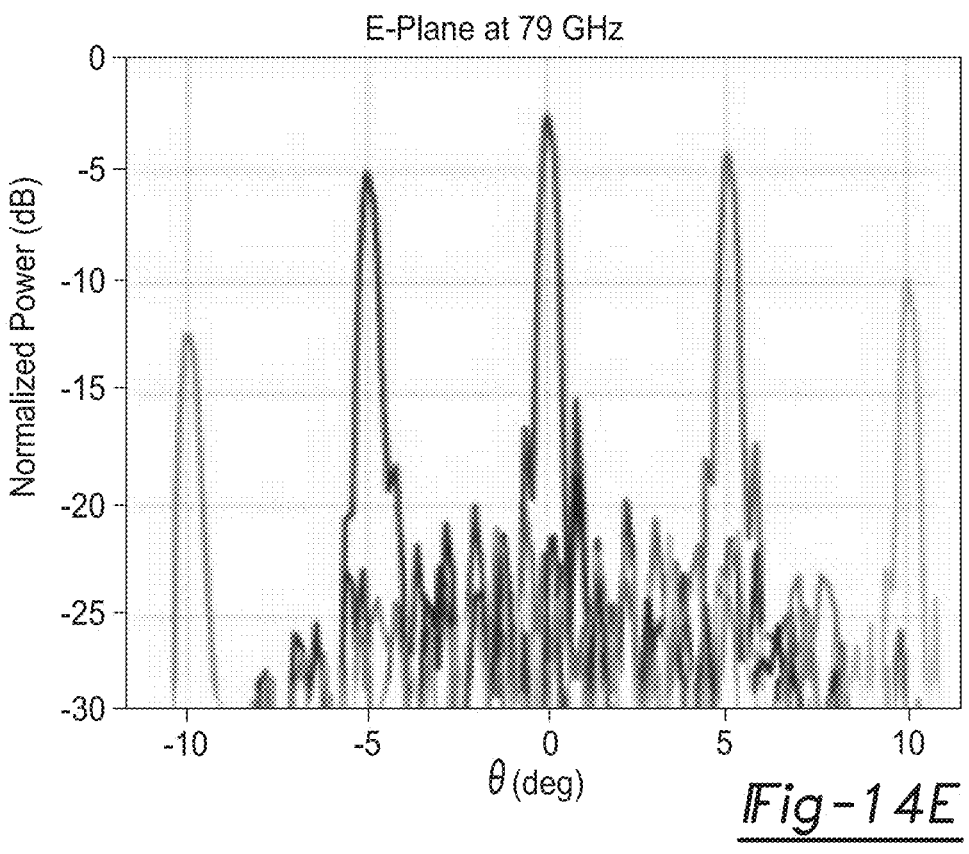
Figure 14F:
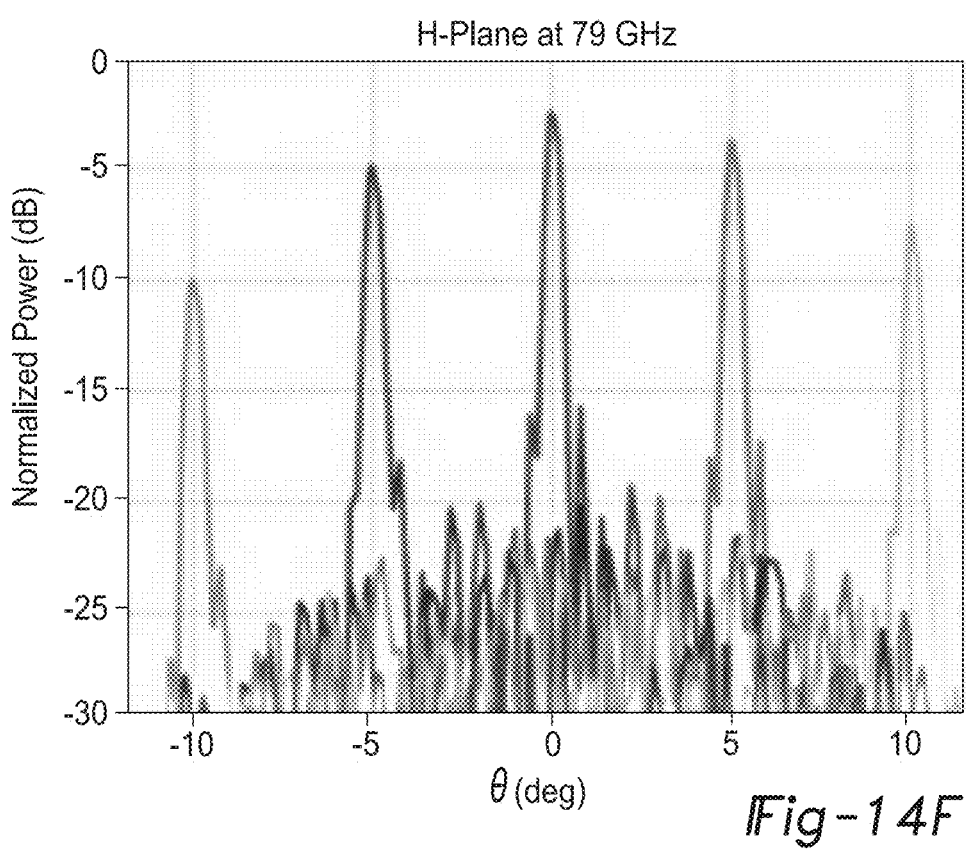

Beamforming measurements are discussed for the two principal planes (E-plane and H-plane). For each principle cut, the sub-reflector angle was incremented in steps of $\gamma_z=5°$ and the main reflector was placed at three locations corresponding to $p_d=\{-155$ mm, $-117$ mm and $-39$ mm$\}$. This produces a synthetic array of 216 elements in three rings. The situation is identical to the first PO array computed above. Therefore, a total of 432 E-plane and H-plane measurements were taken and the measured far-field phase was used to perform beamforming. A phase error is introduced in the measured far-field phase due to manufacturing inaccuracies in the main-reflector. Essentially, the phase center is shifted from it's ideal position. A phase error correction model is developed to correct for the error in the phase center location for each position of the sub-reflector and main reflector. The measured far-field phase is used to correct the location of the phase center. FIGS. 13A and 13B show a comparison between the measured phase and the corrected PO phase for two 'elements' (i.e. for $\gamma_z=0°$ and 90°) in H-plane. The phase error after correction is within $\lambda/8$, which is sufficient for digital beamforming. Once the phase correction model is calculated and applied, digital beamforming can be done using the far-field phase from the PO model. The ability to model the measured far-field phase with less than $\lambda/8$ accuracy using PO and a phase error model validates the design methodology presented above.

Figure 16:
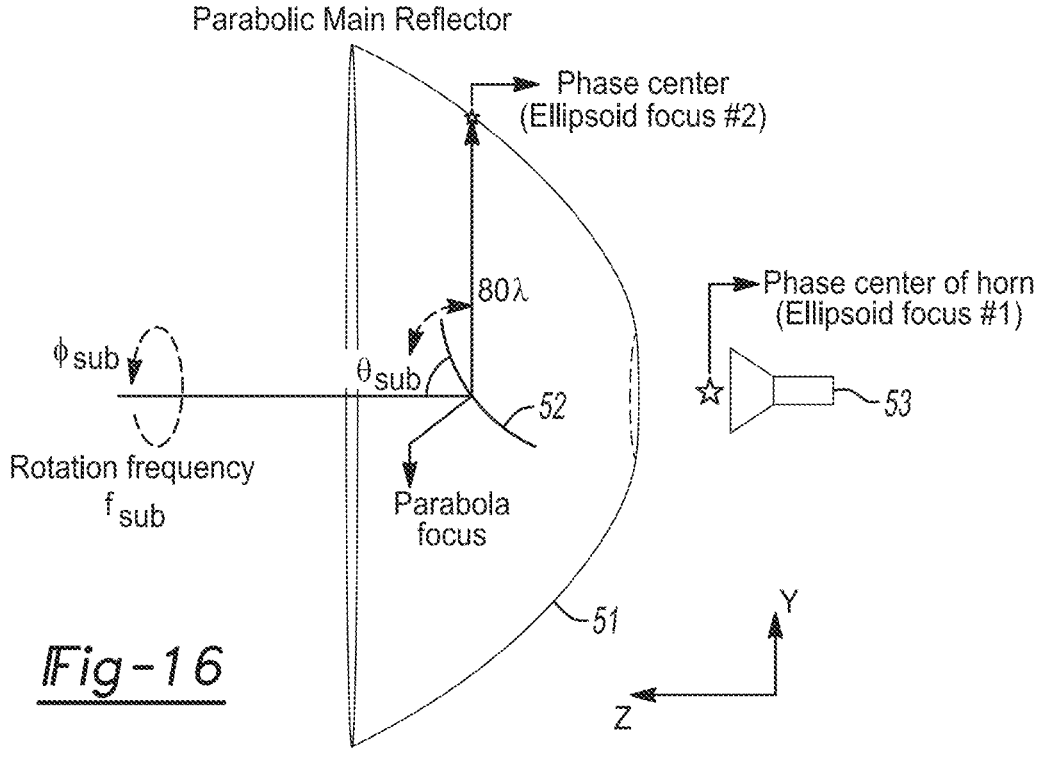
FIG. 16 is a side view of the second embodiment of a dual reflector antenna system.

The pencil beams generated from the measured far-field data for 77 GHz, 78 GHz and 79 GHz are shown in FIG. 16, where the normalization is done with respect to the boresight beam at 77 GHz. At 77 GHz, the results are identical to those shown in FIGS. 14A-14F. The half-power beamwidth is 0.4° for all scan angles. From 77 GHz to 78 GHz, the beamwidth and power remain stable. The power drops by 3 dB at 79 GHz while the beamwidth remains at 0.4°.

So far not much has been said about the sidelobe levels. This is because the presence of sidelobes here arose due to the choice of array used. To limit the number of measurements to a reasonable value, the sub-reflector rotation step size was set to 5°. When operating this antenna as part of a radar, the rotation is continuous and the corresponding element spacing can be made arbitrarily small. This would reduce the side-lobes away from the main beam to below −20 dB. The close sidelobes however are produced by the number of rings used.

Again, the choice of using 3 rings was to limit the number of pattern measurements. In radar mode, the main reflector can be moved continuously as the sub-reflector rotates to produce a spiral instead of 3 rings. This would reduce even the close sidelobes to below −20 dB.

Figure 15:
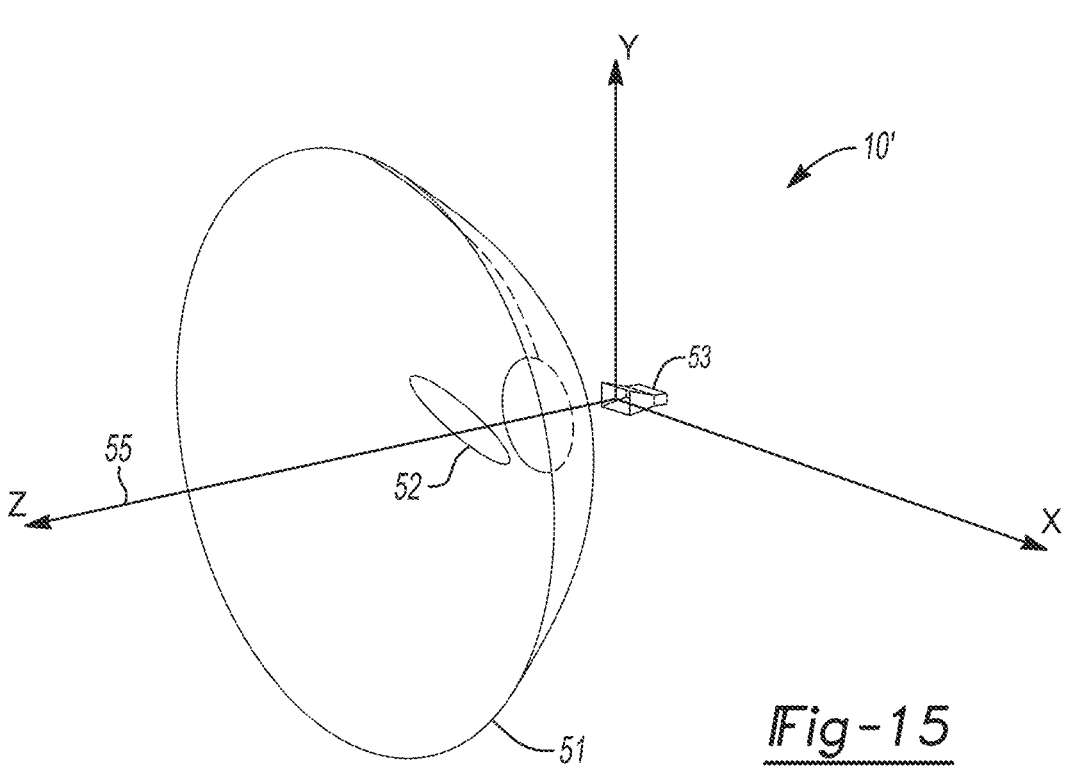
FIG. 15 is a perspective view of a second embodiment of a dual reflector antenna system.
Figure 17:
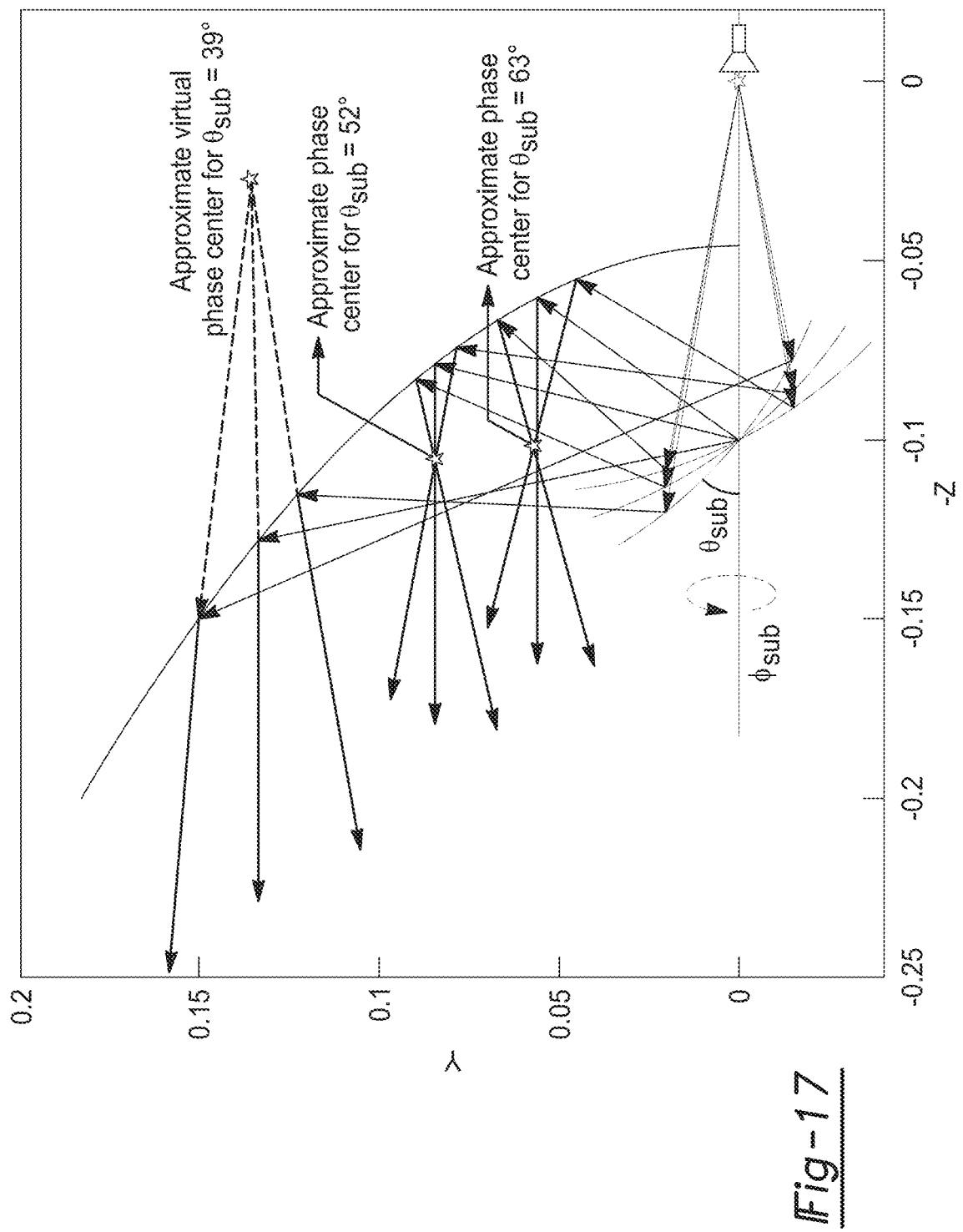
FIG. 17 illustrates the operation of the second embodiment of the dual reflector antenna system at different positions.

FIGS. 15-17 depict a second example embodiment of the dual reflector antenna system 10'. The dual-reflector antenna is comprised generally of: a main reflector 51; and a sub-reflector 52. In the second example embodiment, the main reflector 51 has the shape of a paraboloid formed around a principle axis 55. The sub-reflector 52 is arranged within the cone of the main reflector and along the principal axis of the main reflector.

Instead of translating the main reflector in relation to the sub-reflector, the title angle between the main reflector and the sub-reflector is changed. That is, the main reflector 51 remains stationary and does not translate in relation to the sub-reflector 52 in this embodiment. It is envisioned that the sub-reflector may be titled in relation to the main reflector using a linear actuator. In the second embodiment, the sub-reflector 52 also has shape of an ellipsoid, where the ellipsoid of the sub-reflector defines a major axis and the major axis of the sub-reflector which can be tilted between thirty five degrees and sixty five degrees with respect to the principal axis of the main reflector. The dual reflector antenna is fed by feed horn 53. In one example, the tilt angle is changed between three discrete steps (e.g., 39, 52 and 63 degrees). One rotation of the sub-reflector 52 is completed at each step. This produces three circular synthetic apertures, each with a different radius. Except with respect to the differences discussed above, the antenna system 10' is substantially the same as the antenna system 10 described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A dual-reflector antenna, comprising:
a main reflector having shape of a conic, where the conic is formed around a principal axis;
a sub-reflector arranged in the conic along the principal axis of the main reflector and is configured to rotate about the principal axis, wherein the sub-reflector has a shape of an ellipsoid that defines two foci for electromagnetic radiation incident thereon;
wherein the main reflector is configured to translate axially along the principle axis in relation to the sub-reflector;
a feed horn disposed along the principal axis at one of the two foci and operable to guide electromagnetic radiation towards the sub-reflector; and
a controller interfaced with the main reflector and the sub-reflector, wherein the controller rotates the sub-reflector about the principal axis to emanate the electromagnetic radiation in a diverging beam from a set of virtual feed positions that form a first circle and are located behind the dual-reflector antenna, and subsequently translates the main reflector along the principle axis to emanate the electromagnetic radiation from another set of virtual feed positions that form a second circle and are located behind the dual-reflector antenna, where the first circle has different diameter than the second circle, thereby generating a synthetic aperture image.

2. The dual-reflector antenna of claim 1 wherein the ellipsoid of the sub-reflector defining a major axis and the major axis of the sub-reflector is tilted forty-five degrees with respect to the principal axis of the main reflector.

3. The dual-reflector antenna of claim 2 further comprises a motor interoperably coupled to the sub-reflector; and an encoder arranged to measure rotation of the sub-reflector.

4. The dual-reflector antenna of claim 1 further comprises a linear actuator interoperably coupled to the main reflector.

5. The dual-reflector antenna of claim 1 is coupled to a phase coherent wideband radar operating in millimeter-wave band.

6. A dual-reflector antenna, comprising:
a main reflector having shape of a paraboloid, where the paraboloid is formed around a principal axis;
a sub-reflector arranged in the paraboloid along the principal axis of the main reflector and is configured to rotate about the principal axis, wherein the sub-reflector has a shape of an ellipsoid that defines two foci for electromagnetic radiation incident thereon;
a linear actuator drivably coupled to the sub-reflector and operable to tilt the sub-reflector in relation to the principal axis, wherein the ellipsoid of the sub-reflector defining a major axis and the major axis of the sub-reflector is tilted with respect to the principal axis of the main reflector while rotating about the principal axis; and
a feed horn disposed along the principal axis at one of the two foci and operable to guide electromagnetic radiation towards the sub-reflector; and
a controller interfaced with the main reflector and the sub-reflector, wherein the controller rotates the sub-reflector about the principal axis to emanate the electromagnetic radiation in a diverging beam from a set of virtual feed positions that form a first circle and are located behind the dual-reflector antenna, and subsequently change tilt angle between the main reflector and the sub-reflector to emanate the electromagnetic radiation from another set of virtual feed positions that form a second circle and are located behind the dual-reflector antenna, where the first circle has different diameter than the second circle, thereby generating a synthetic aperture image.

7. The dual-reflector antenna of claim 6 further comprises a motor interoperably coupled to the sub-reflector; and an encoder arranged to measure rotation of the sub-reflector.

8. The dual-reflector antenna of claim 6 is coupled to a phase coherent wideband radar operating in millimeter-wave band.

\* \* \* \* \*